(12) United States Patent
Lee

(10) Patent No.: US 12,307,156 B2
(45) Date of Patent: May 20, 2025

(54) METHOD, APPARATUS, COMPUTER PROGRAM, AND RECORDING MEDIUM THEREOF FOR MANAGING SOUND EXPOSURE IN WIRELESS COMMUNICATION SYSTEM

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 7 days.

(21) Appl. No.: 17/767,591

(22) PCT Filed: Oct. 8, 2020

(86) PCT No.: PCT/KR2020/013719
§ 371 (c)(1),
(2) Date: Apr. 8, 2022

(87) PCT Pub. No.: WO2021/071272
PCT Pub. Date: Apr. 15, 2021

(65) Prior Publication Data
US 2024/0078076 A1    Mar. 7, 2024

(30) Foreign Application Priority Data

Oct. 10, 2019 (KR) .......................... 10-2019-0125061

(51) Int. Cl.
*G06F 3/16* (2006.01)

(52) U.S. Cl.
CPC .................... *G06F 3/165* (2013.01)

(58) Field of Classification Search
CPC ....................................................... G06F 3/165
See application file for complete search history.

(56) References Cited

U.S. PATENT DOCUMENTS

2008/0159547 A1* 7/2008 Schuler .................... H04R 5/04
455/566

FOREIGN PATENT DOCUMENTS

| KR | 10-2008-0038586 A | 5/2008 |
|----|-------------------|--------|
| KR | 10-2013-0071471 A | 6/2013 |
| KR | 10-2016-0023166 A | 3/2016 |
| KR | 10-2017-0103539 A | 9/2017 |
| KR | 10-2019-0104820 A | 9/2019 |

OTHER PUBLICATIONS

International Search Report for PCT/KR2020/013719, dated Jan. 15, 2021.

* cited by examiner

*Primary Examiner* — Joseph Saunders, Jr.
(74) *Attorney, Agent, or Firm* — Sughrue Mion, PLLC

(57) ABSTRACT

The present disclosure relates to a method, an apparatus, a computer program, and a recording medium thereof for managing sound exposure in a wireless communication system. A method for reporting a volume level in a wireless communication system, according to an embodiment of the present disclosure, comprises: a step of reporting, to a first device, first information related to a sound pressure level (SPL) of a second device; a step in which a second device receives second information including a volume setting from the first device; and a step in which the second device adjusts the volume of the second device on the basis of the first information and the second information.

10 Claims, 32 Drawing Sheets

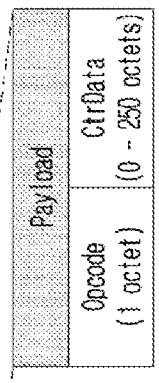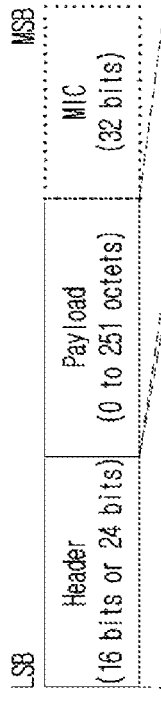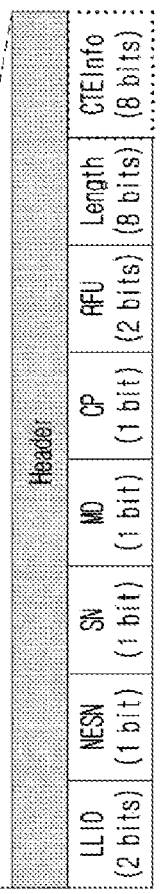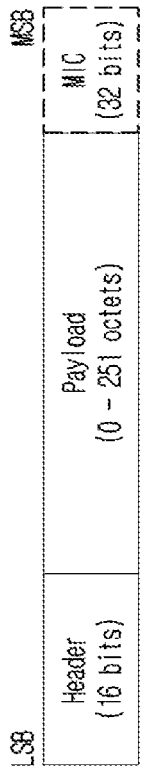
FIG. 19(a)
FIG. 19(b)
FIG. 19(c)
FIG. 19(d)

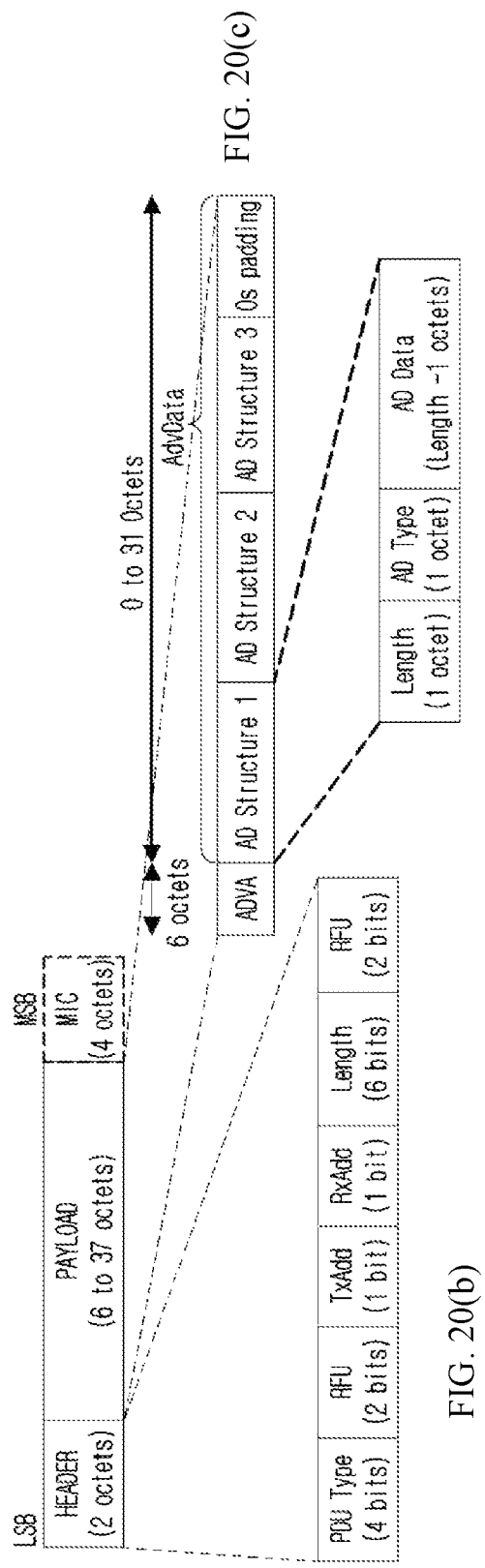

METHOD, APPARATUS, COMPUTER PROGRAM, AND RECORDING MEDIUM THEREOF FOR MANAGING SOUND EXPOSURE IN WIRELESS COMMUNICATION SYSTEM

CROSS-REFERENCE TO RELATED APPLICATIONS

This application is a National Stage of International Application No. PCT/KR2020/013719 filed Oct. 8, 2020, claiming priority based on Korean Patent Application No. 10-2019-0125061, filed on Oct. 10, 2019, the contents of which are all hereby incorporated by reference herein in their entirety.

TECHNICAL FIELD

The present disclosure relates to a method, an apparatus, a computer program, and a recording medium thereof for sound exposure management in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

Recently, with the development of various audio device technologies, opportunities for users to carry and personally consume audio content have greatly increased. At the same time, problems such as hearing damage due to an increase in the intensity and time of sound that a user listens to have been raised. For safe listening, it is necessary to check and manage the extent to which the user is exposed to sound, but there is no communication method between devices to support this.

DISCLOSURE

Technical Problem

The technical problem of the present disclosure is to provide a method and apparatus for managing sound exposure in a wireless communication system.

An additional technical problem of the present disclosure is to provide a method and apparatus for configuring a volume based on information related to a sound pressure level of another device in a wireless communication system or adjusting a volume based on a volume setting by another device.

A further technical problem of the present disclosure is to provide a method and apparatus for calculating and managing a cumulative exposure amount in one or more source devices or one or more sink devices in a wireless communication system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method for performing volume level reporting in a wireless communication system according to an aspect of the present disclosure may include: reporting, to a first device, first information related to a sound pressure level (SPL) of a second device, receiving, by the second device, second information including a volume setting from the first device, and adjusting, by the second device, a volume of the second device based on the first information and the second information.

A device for performing volume level reporting in a wireless communication system according to an aspect of the present disclosure may include: a transceiver for performing signal transmission and reception with another device and a processor for controlling the transceiver and the device, and the processor may be configured to: report first information related to a sound pressure level (SPL) of the device to the another device through the transceiver, receive second information including a volume setting from the another device through the transceiver, and adjust a volume of the device based on the first information and the second information.

The features briefly summarized above with respect to the present disclosure are merely exemplary aspects of the detailed description of the present disclosure that follows, and do not limit the scope of the present disclosure.

Technical Effects

According to the present disclosure, a method and apparatus for managing sound exposure in a wireless communication system may be provided.

According to the present disclosure, a method and apparatus for configuring a volume based on information related to a sound pressure level of another device in a wireless communication system or adjusting a volume based on a volume setting by another device may be provided.

According to the present disclosure, a method and apparatus for calculating and managing a cumulative exposure amount in one or more source devices or one or more sink devices in a wireless communication system may be provided.

The technical effects of the present disclosure are not limited to the above-described effects, and other effects not mentioned herein may be understood to those skilled in the art from the following description.

BRIEF DESCRIPTION OF DRAWINGS

FIGS. 14(a) to FIGS. 16(b) are diagrams illustrating a message exchange process between a server and a client to which the present disclosure is applicable.

FIGS. 18(a) to 18(d) are diagrams illustrating a packet format for each layer to which the present disclosure is applicable.

FIGS. 19(a) to 19(d) are diagrams illustrating examples of a data unit format to which the present disclosure is applicable.

FIGS. 20(a) to 20(d) are diagrams illustrating examples of an advertisement unit format to which the present disclosure is applicable.

BEST MODE

Figure 1A:
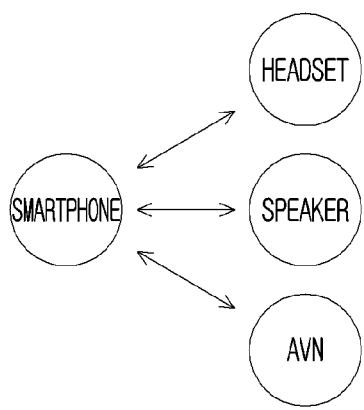
FIGS. 1(a) and 1(b) are diagrams exemplarily illustrating a conventional audio connection type and an audio connection type to which the present disclosure is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

Figure 1B:
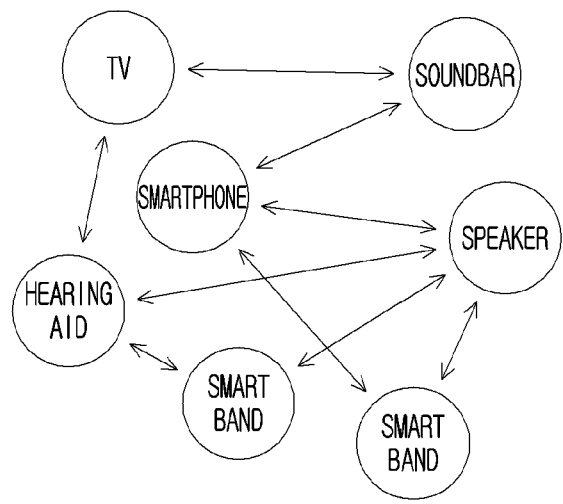

FIGS. 1(a) and 1(b) are diagrams exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

FIG. 2 is a diagram exemplarily illustrating a conventional audio-related protocol stack and an audio-related protocol stack to which the present disclosure is applicable.

Figures 2A, 2B:
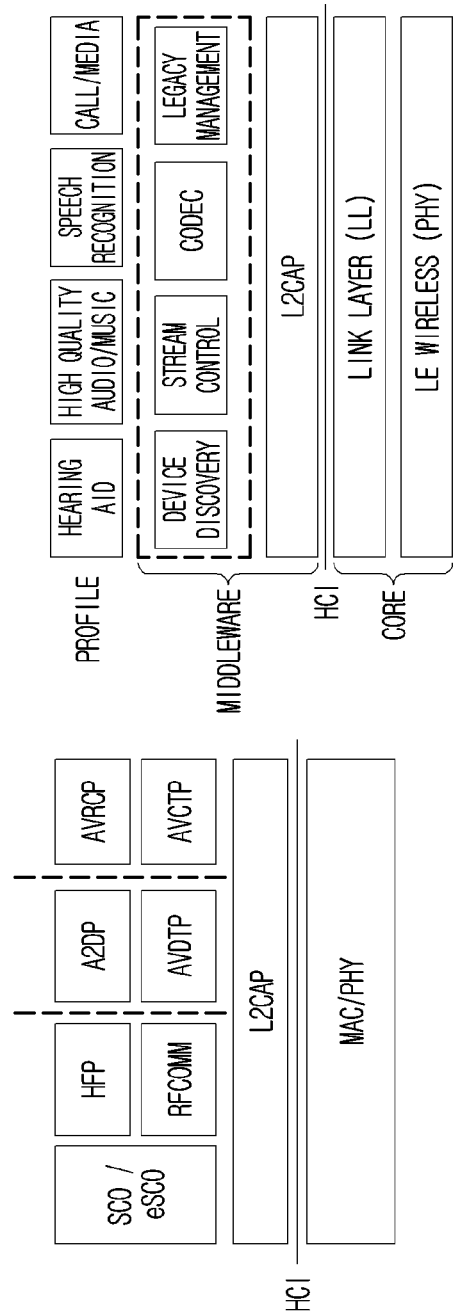
FIGS. 2(a) and 2(b) are diagrams exemplarily illustrating a conventional audio-related protocol and an audio-related protocol stack to which the present is applicable.

FIG. 2(a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCI (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCI may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCI command packet. Information transmitted from a controller to a host may be referred to as a HCI event packet. In addition, HCI asynchronous data packets or HCI synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;
Audio Stream Session Service (Audio Stream Session Service, ASSS): Audio Stream Session Service (ASSS) is a service that supports discovery, setup, establishment, control, and management related to an audio session;
Audio Input Management Service (AIMS): a service for managing audio input volume, etc.;
Audio Routing Service (ARS): a service for selecting the location of audio inputs and outputs;
Audio Middleware Profile (AMP): a basic profile for the behavior of a device to distribute audio;
Call Management Profile (CMP): a profile of the roles and procedures of interaction between two devices for a call;
Audio General Middleware Profile (AGMP): a basic profile that enables content and/or stream control;
Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:
  Audio Player Management Profile (APMP): a profile that supports the control or interaction of an audio player;
  Audio Player Management Service (APMS): a service that supports the control or interaction of an audio player;
  Microphone Management Profile: a profile for microphone state management;
  Microphone Management Service: a service that supports interfaces and states for microphone state management;
  Quick Service Discovery Service (QSDS): a service that supports quick discovery of services such as audio player management and call management;
  Call Bearer Service: a service that supports management of a call interface and a call state for a bearer on a device;
  Volume Management Profile: a profile that supports audio volume management of a device;
  Volume Management Service: a service that supports the device's audio volume interface and state;
  Volume Offset Management Service: a service for volume management for audio output.

Figure 3:
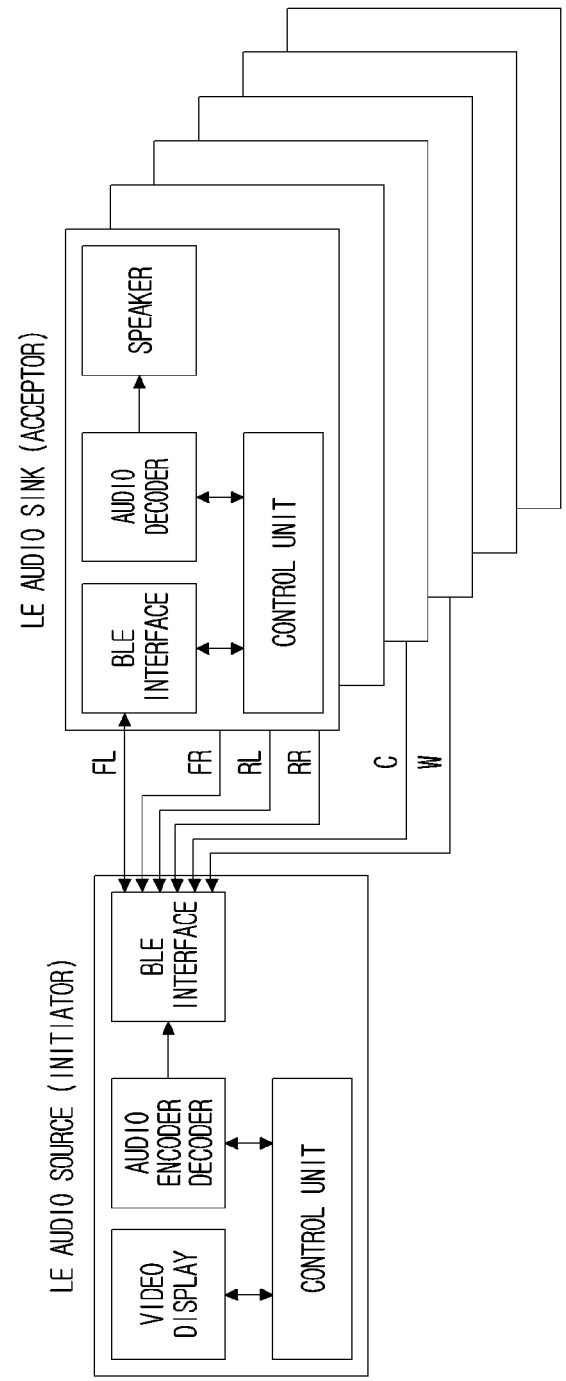
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session.

Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4A:
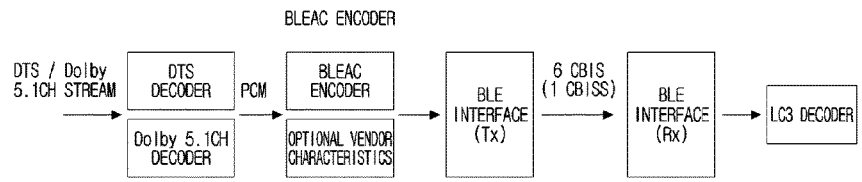
FIGS. 4(a) to 4(c) are diagrams illustrating an audio data encoding/decoding process to which the present disclosure is applicable.
Figure 4B:
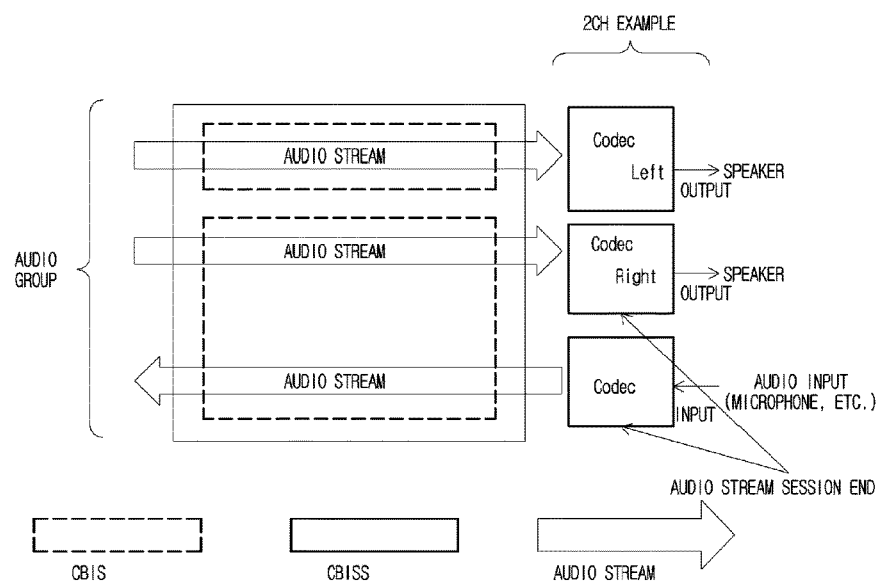
Figure 4C:
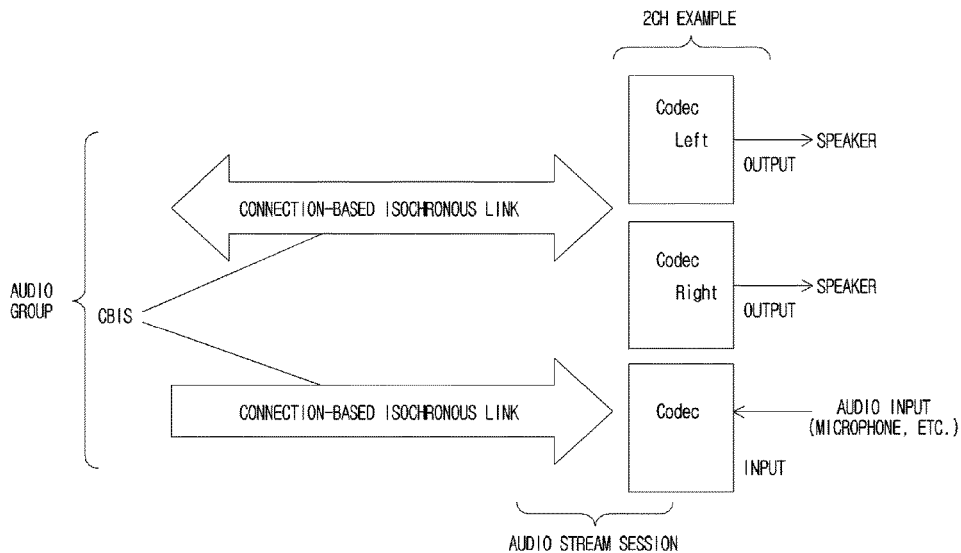

FIGS. 4(a) to 4(c) are diagrams illustrating an audio data encoding/decoding process to which the present disclosure is applicable.

Referring to FIG. 4(a), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
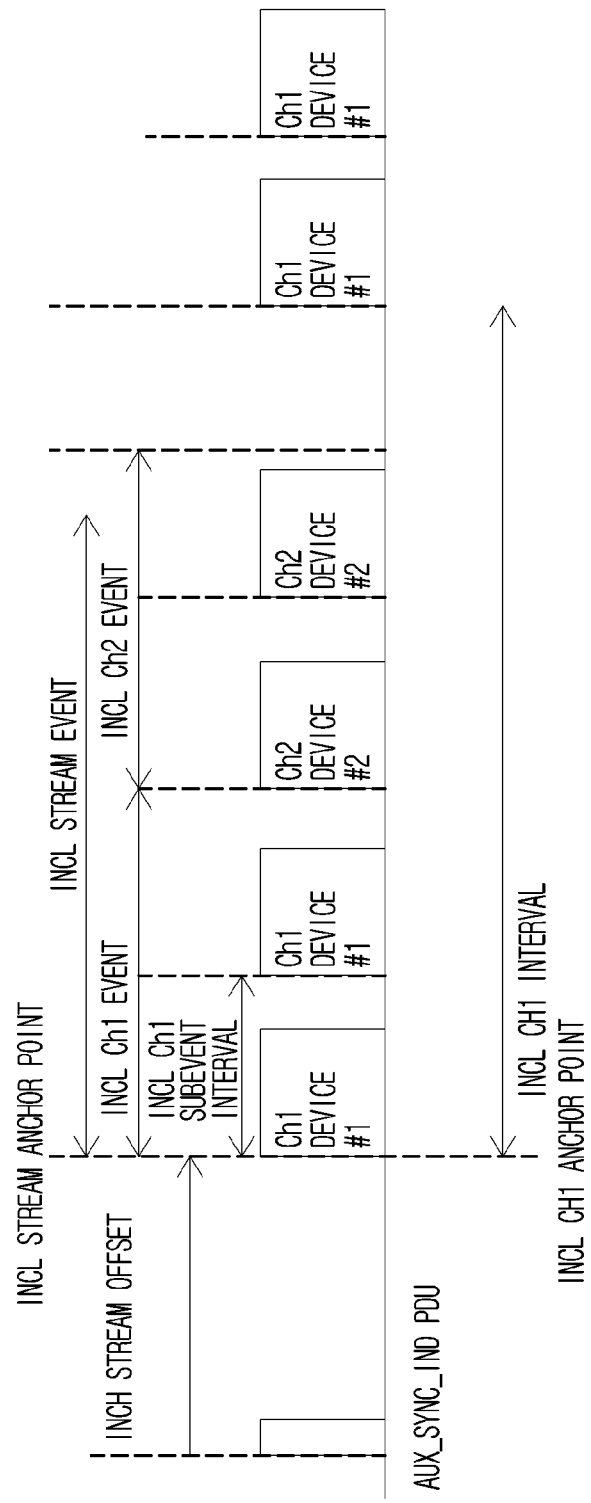
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
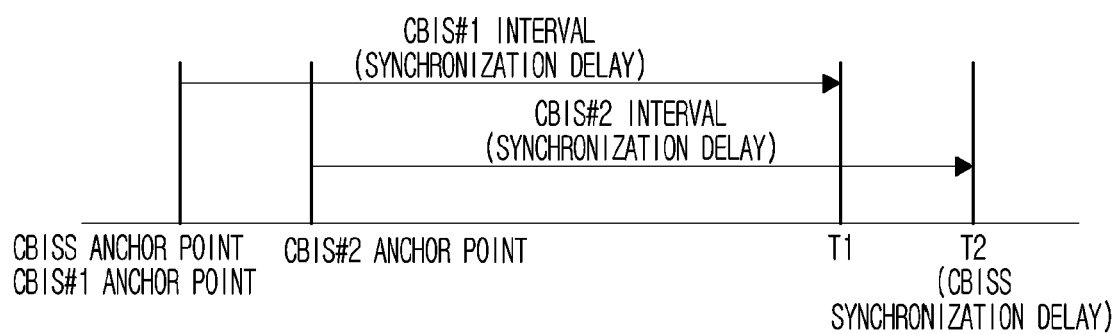
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
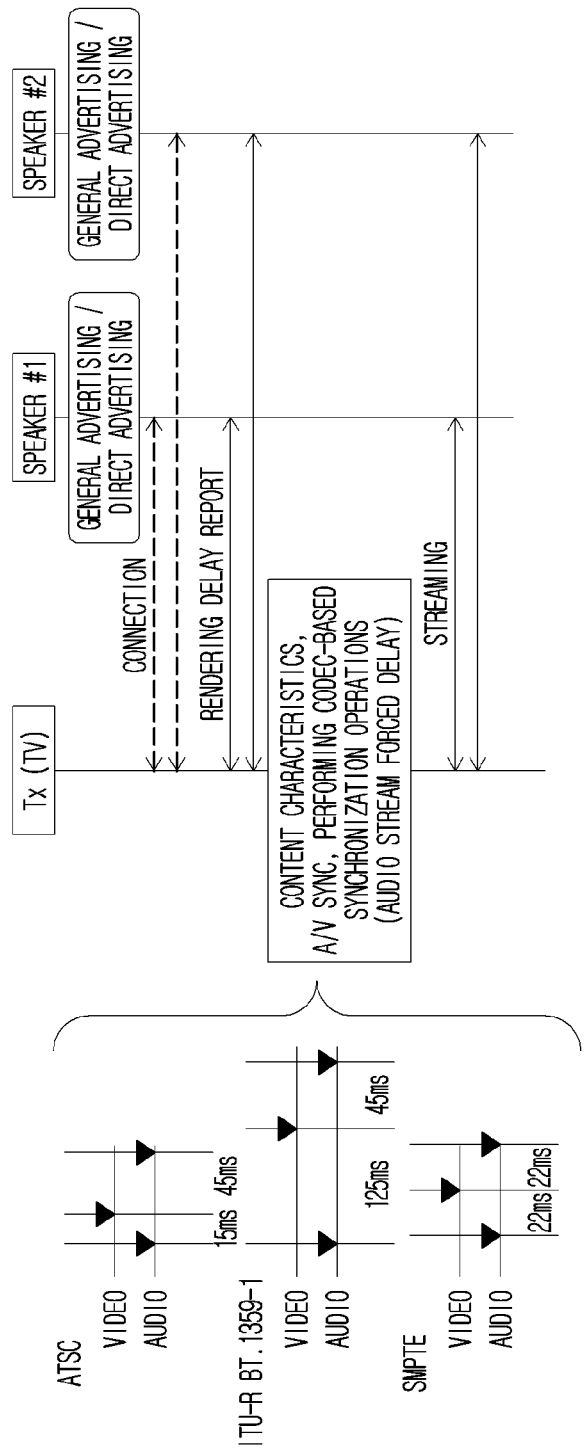
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
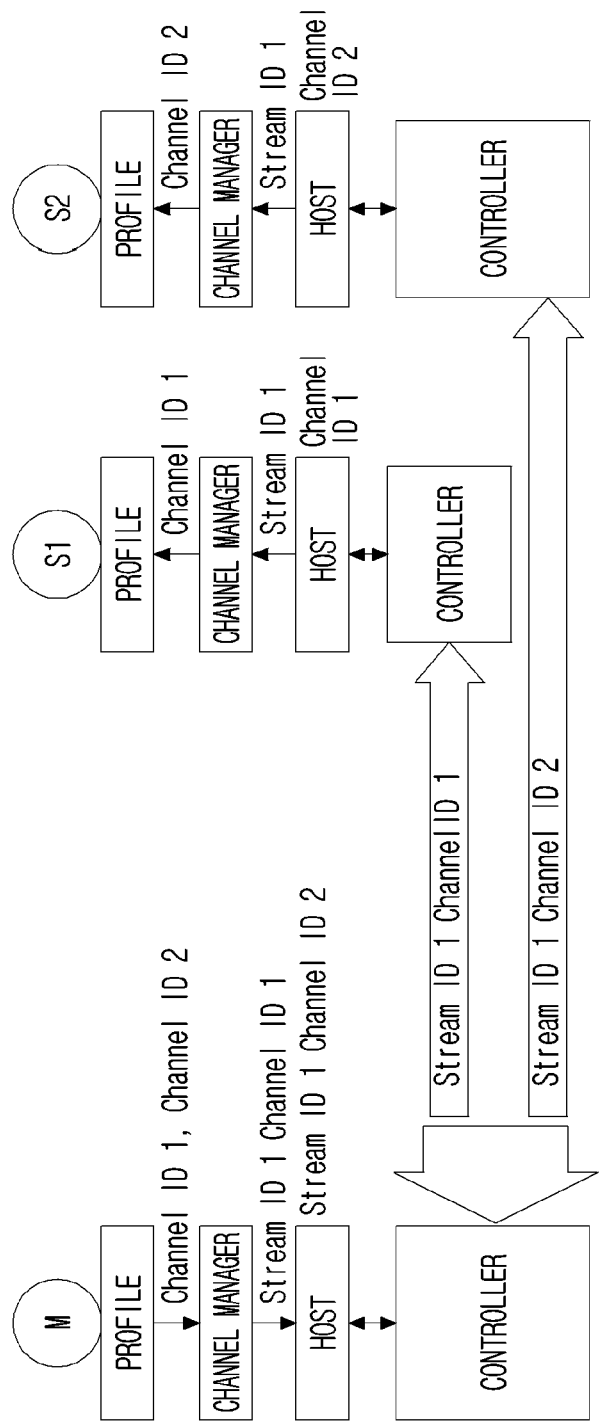
FIG. 8 and FIG. 9 are diagrams for describing the operation of the ICL type and the INCL type to which the present disclosure is applicable.
Figure 9:
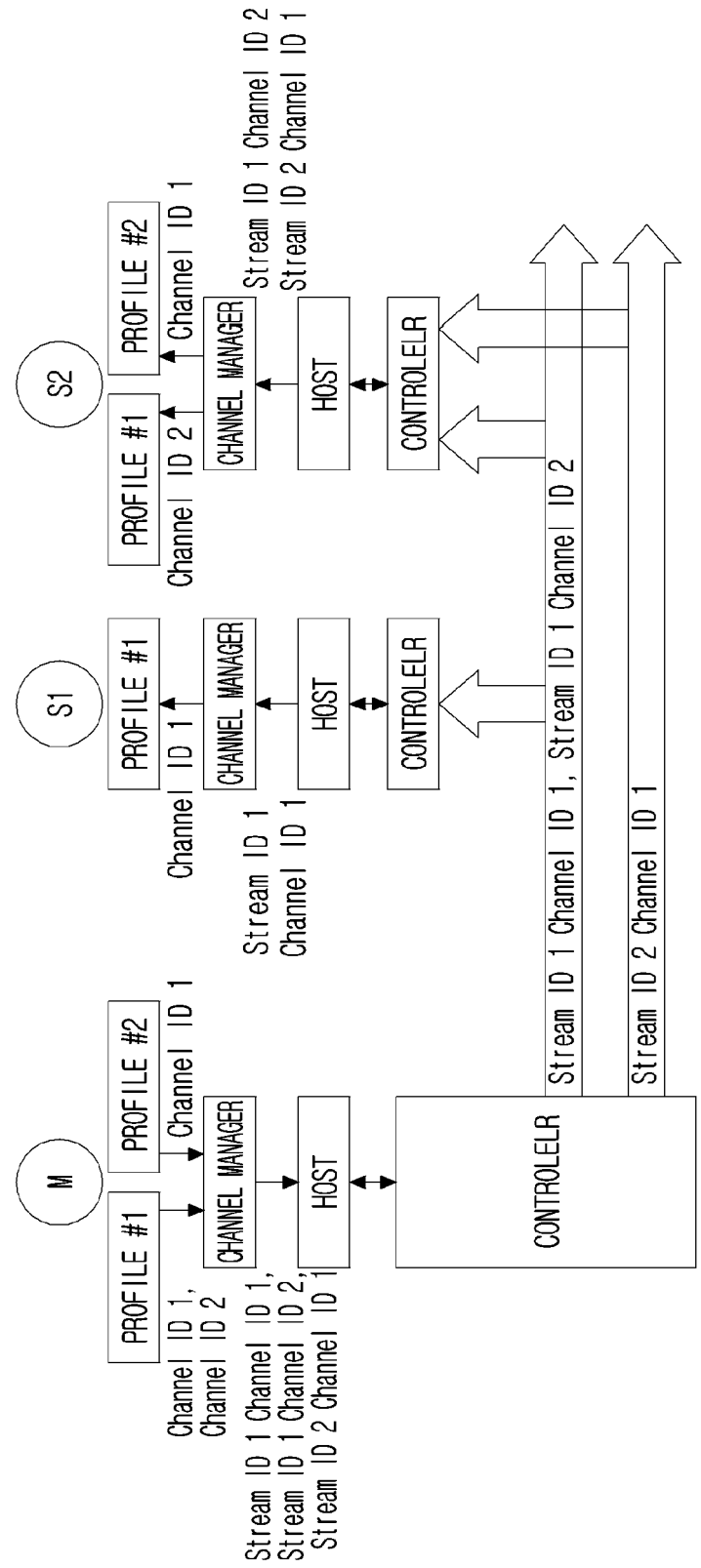

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID I. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
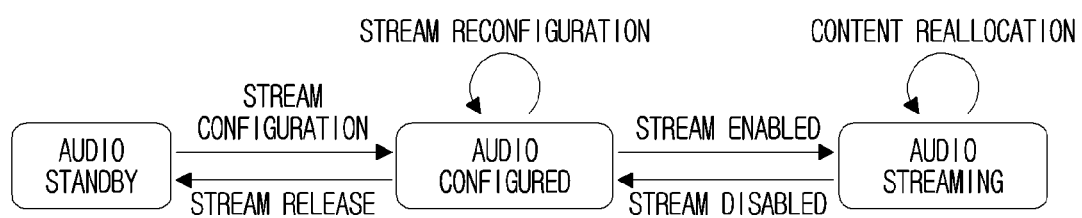
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
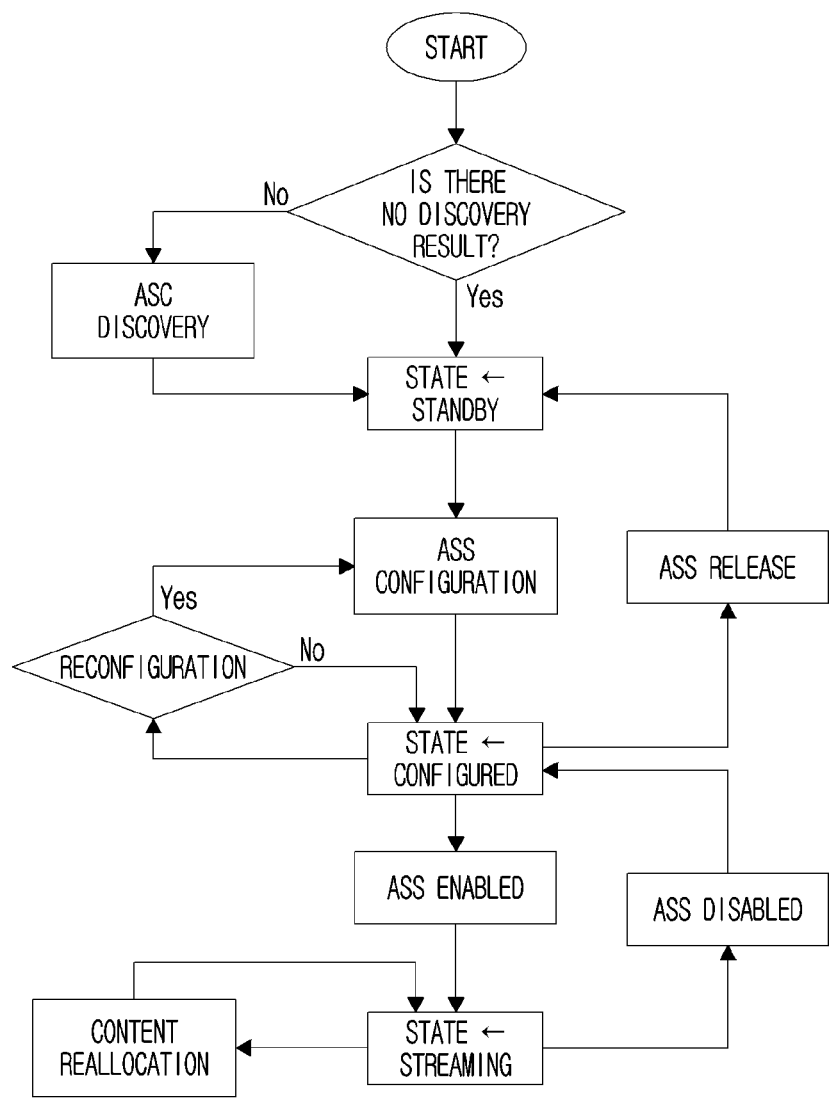
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is enabled, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
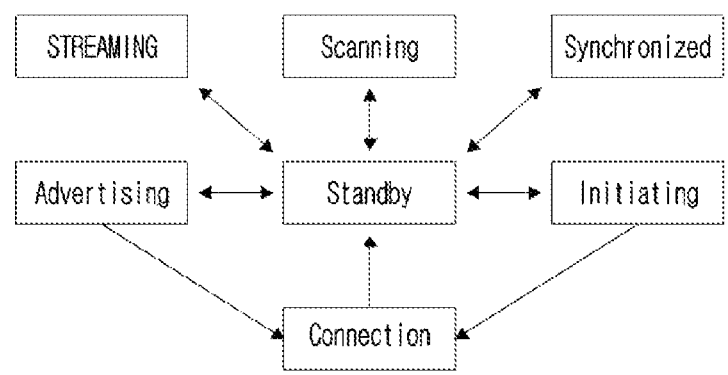
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
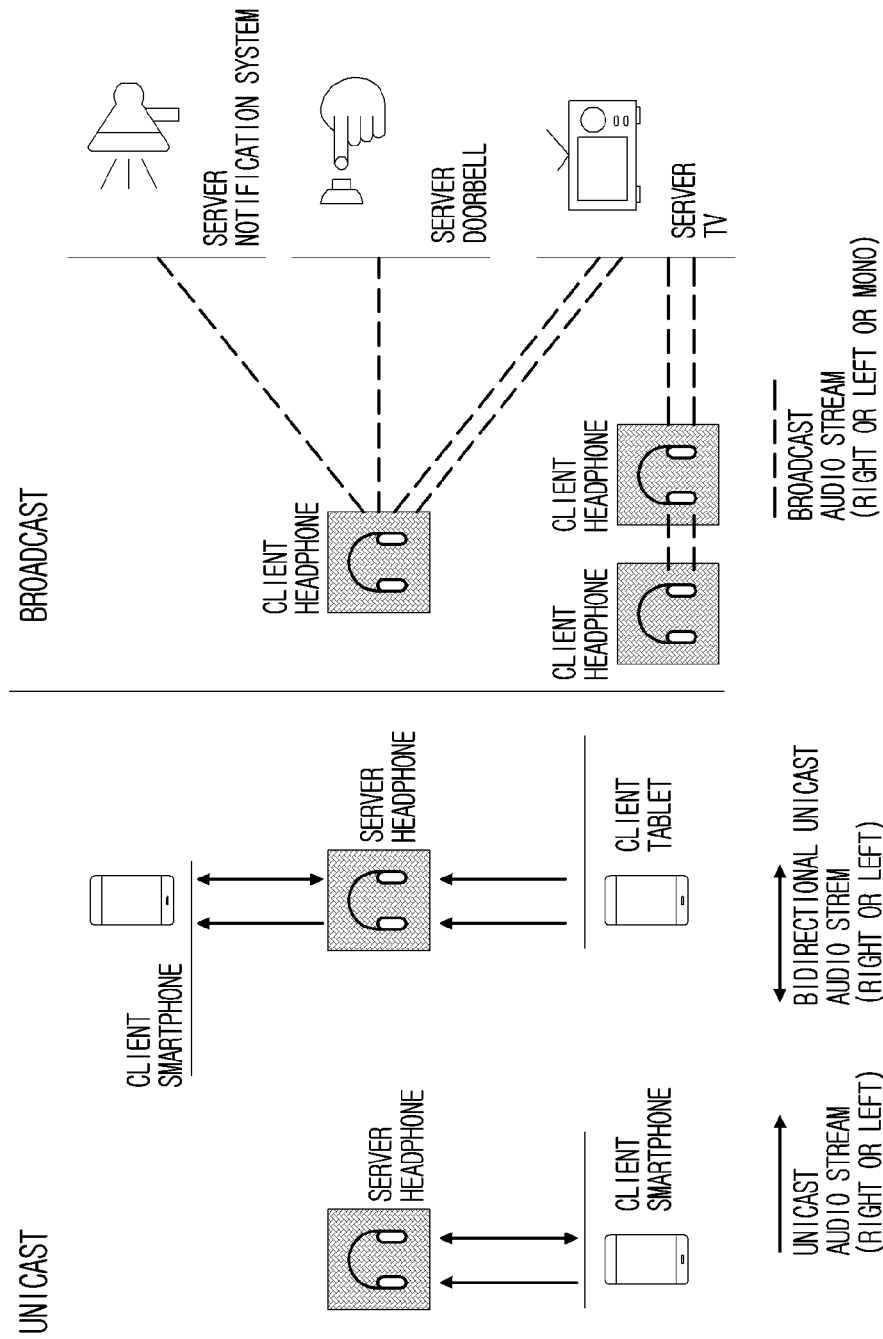
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

FIGS. 14(a) to FIGS. 16(b) are diagrams illustrating a message exchange procedure between a server and a client to which the present disclosure is applicable.

In the example of FIGS. 14(a) to FIGS. 16(b), the client may be an audio source and the server may be an audio sink. Or, the client may be an audio sink and the server may be an audio source.

Figures 14A, 14B:
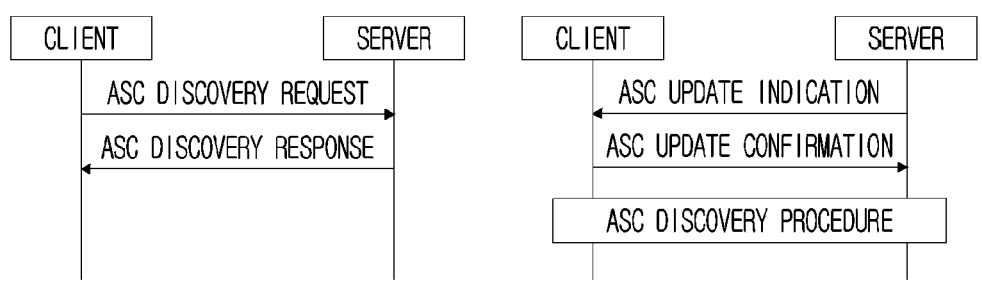

FIGS. 14(a) to 14(c) exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIGS. 14(a) to 14(c) may be defined as shown in Table 1 below.

TABLE 1

ASC_DISCOVERY REQUEST
Direction
ASC_DISCOVERY RESPONSE
Sink Locations : Bitmap
Source Locations : Bitmap
Number of ASC Records
Direction
Codec ID
Sampling Frequency
Codec Specific
Content Protection Type
Content Protection type Specific The ASC update indication message and the ASC update confirmation message may include information indicating that ASC discovery is required and confirmation information therefor, respectively.

Figures 15A, 15B:
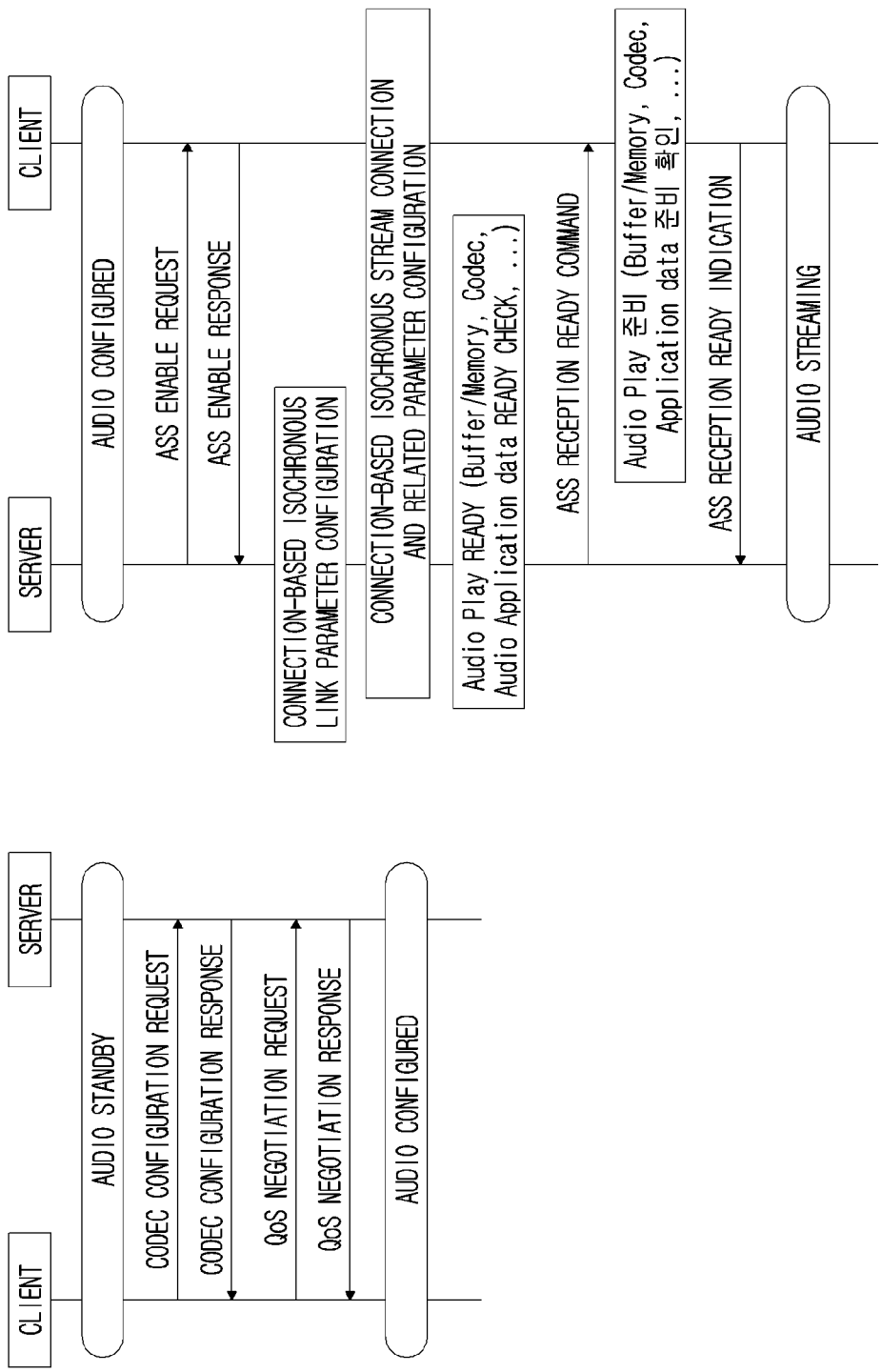

FIGS. 15(a) and 15(b) exemplarily illustrate a unicast audio stream configuration procedure and an unicast audio stream establishment procedure.

In the unicast audio stream configuration procedure of FIG. 15 (a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15 (b), the client may transmit an ASS enable request message to the server in the AUDIO CONFIGURED state to inform information on the ASS requesting activation. In response, the server may transmit an ASS enable response message to the client to inform about which ASS to enable. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIGS. 15(a) and 15(b) may be defined as shown in table 2 below.

TABLE 2

Figures 16A, 16B:
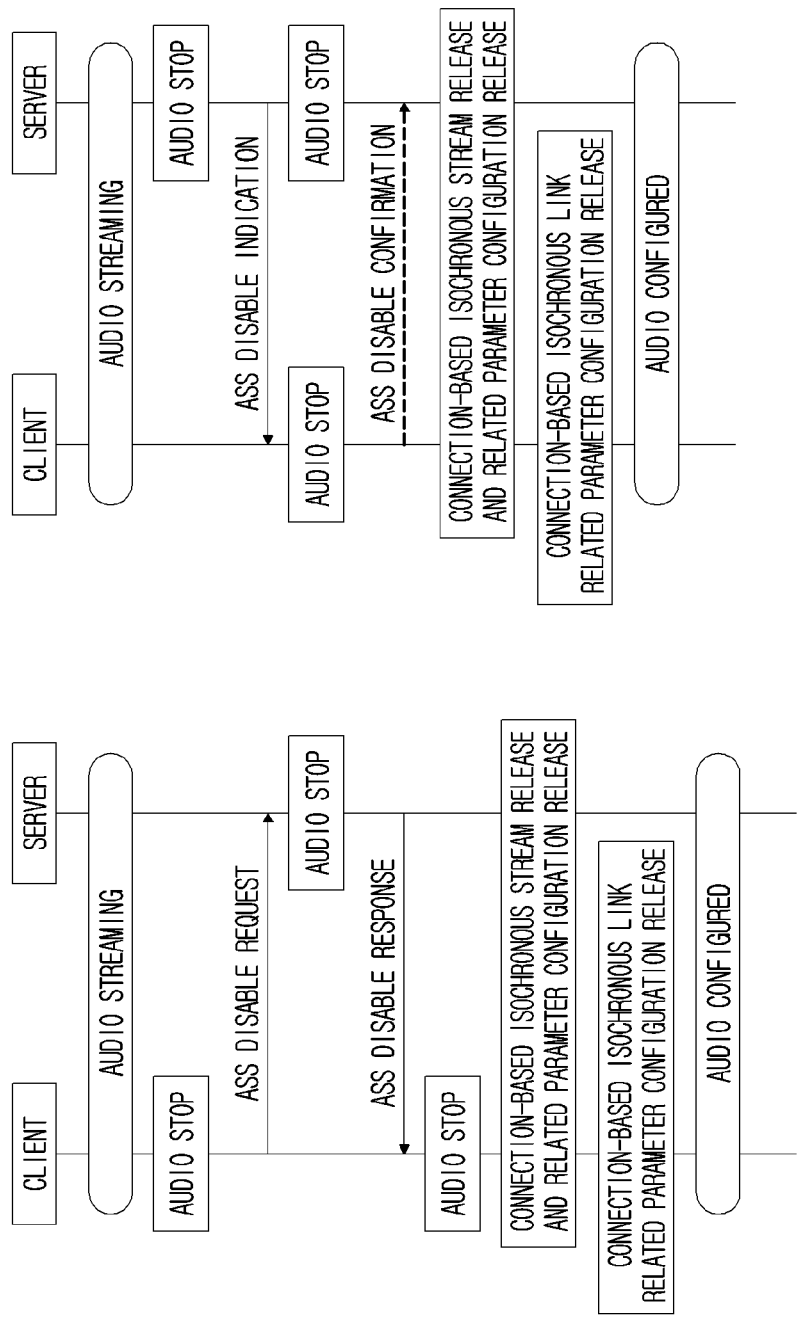

CODEC CONFIGURATION REQUEST
ASS ID
ASA ID
Direction
Codec ID
Sampling Frequency
Codec Specific
CODEC CONFIGURATION RESPONSE
ASS ID
Server Supported QoS (Interleaved, Framed, Transport Latency)
Presentation delay
QOS NEGOTIATION REQUEST
ASS ID
CBISS ID
CBIS ID
Client QoS (Transport Latency)
Rendering Delay
QOS NEGOTIATION RESPONSE
ASS ID TABLE 2-continued ASS ENABLE REQUEST / ASS ENABLE RESPONSE
Number of ASS ID
ASS ID
ASA ID
Content Type
ASS RX READY COMMAND / ASS RX READY NOTIFICATION
Number of ASS ID
ASS ID FIGS. 16(a) and 16(b) exemplarily illustrates a procedure for disabling an audio stream by a client and a procedure for disabling an audio stream by a server.

In the procedure of the client disable audio streams in FIG. 16(a), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(b), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIGS. 16(a) and 16(b) may be defined as shown in table 3 below.

TABLE 3

ASS DISABLE REQUEST / ASS DISABLE RESPONSE / ASS
DISABLE INDICATION
Number of ASS ID
ASS ID
(No Contents)

Table 4 below exemplarily shows content reallocation request/response, ASS release request/response, general advertisement, and directed advertisement message formats.

TABLE 4

Figure 17:
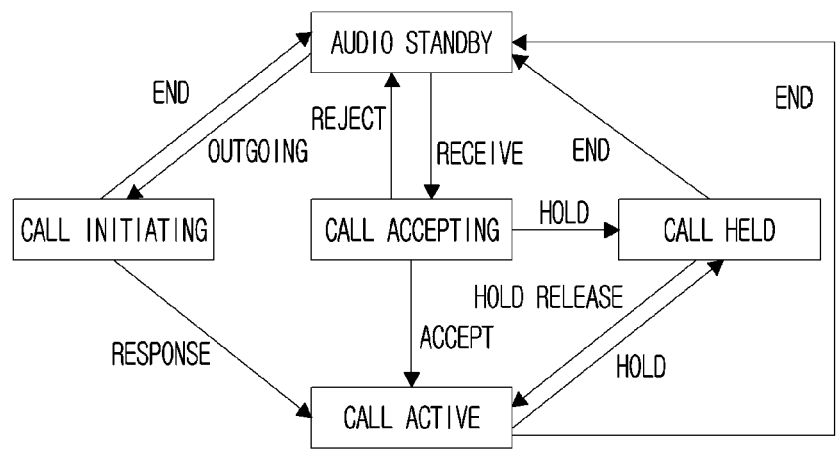
FIG. 17 is a diagram illustrating a state machine for a call service to which the present disclosure is applicable.

REASSIGN CONTENT REQUEST / REASSIGN CONTENT
RESPONSE
Number of ASS ID
ASS ID
ASA ID
Content Type
ASS RELEASE REQUEST / ASS RELEASE RESPONSE
ASS ID
GENERAL ADVERTISEMENT
DIRECTED ADVERTISEMENT
Content Type
Meta data FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY sate, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
|---|---|---|---|---|
| Connection based Isochronous Stream | Stream (framed of unframed) LE-S or LE-F | LE isochronous physical link | LE | Unidirectional or bidirectional transport in a point-to-point connection for transferring isochronous data. |
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

Figures 18A, 18C, 18D:
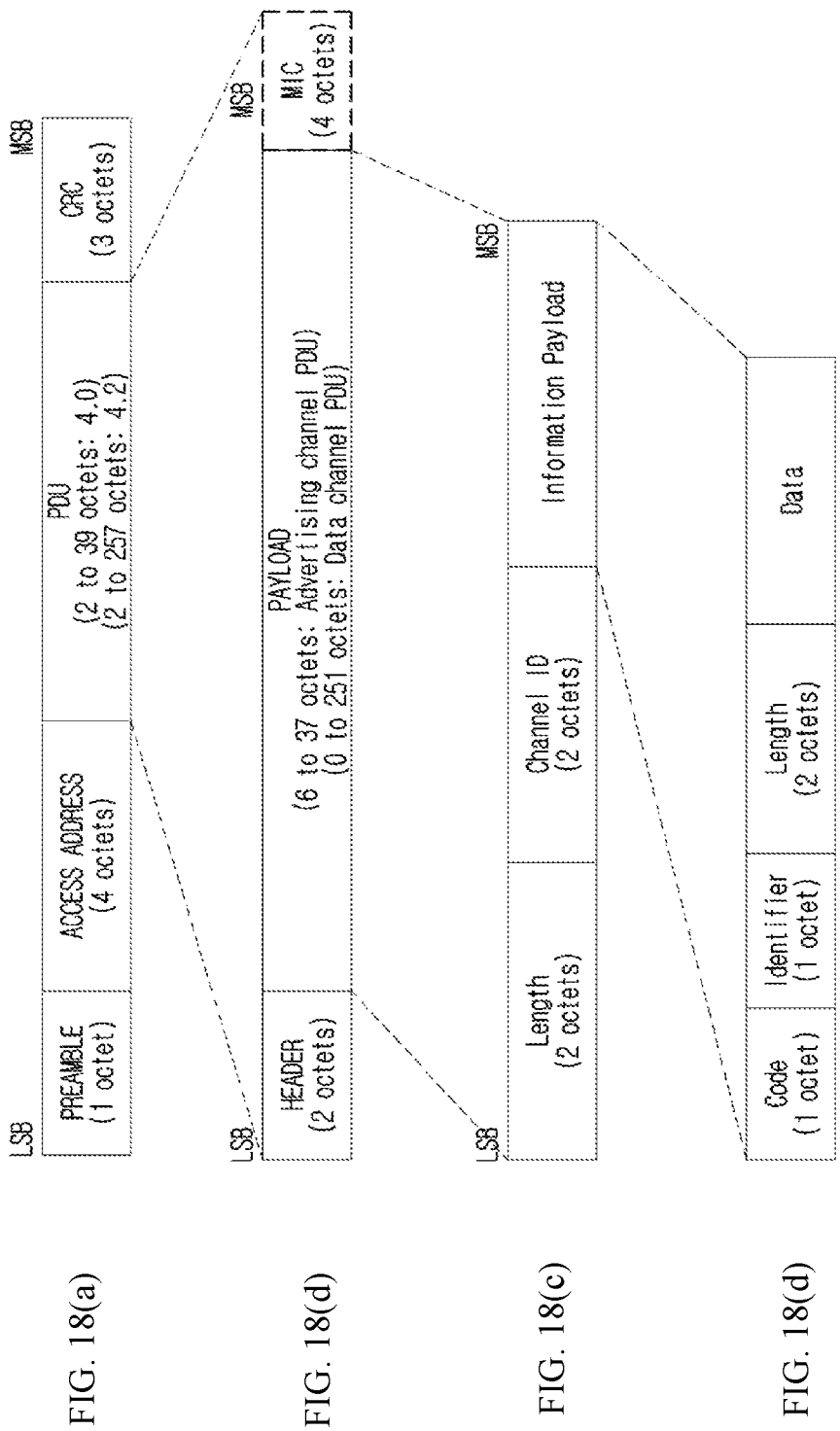

FIGS. 18(a) and 18(b) are diagrams illustrating a packet format for each layer to which the present disclosure is applicable.

FIG. 18(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(b) illustrates an exemplary format of the PDU of FIG. 18(a). PDU may be defined in two types, one is a data channel PDU (Data channel PDU), the other is an advertising channel PDU (Advertising channel PDU). The data channel PDU will be described in detail with reference to FIGS. 19(a) to 19(d), and the advertising channel PDU will be described in detail with reference to FIGS. 20(a) to 20(d).

FIG. 18(c) illustrates an example of an L2CAP PDU format, which may correspond to an exemplary format of the payload field of FIG. 18(b). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(c) is an L2CAP PDU (i.e., a control frame) transmitted on a signaling channel, the information payload field of FIG. 18(c) may be configured as shown in FIG. 18(d). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

FIGS. 19(a) to 19(d) are diagrams illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

FIGS. 20(a) to 20(d) are diagrams illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, a volume level reporting method according to the present disclosure will be described.

Figure 21:
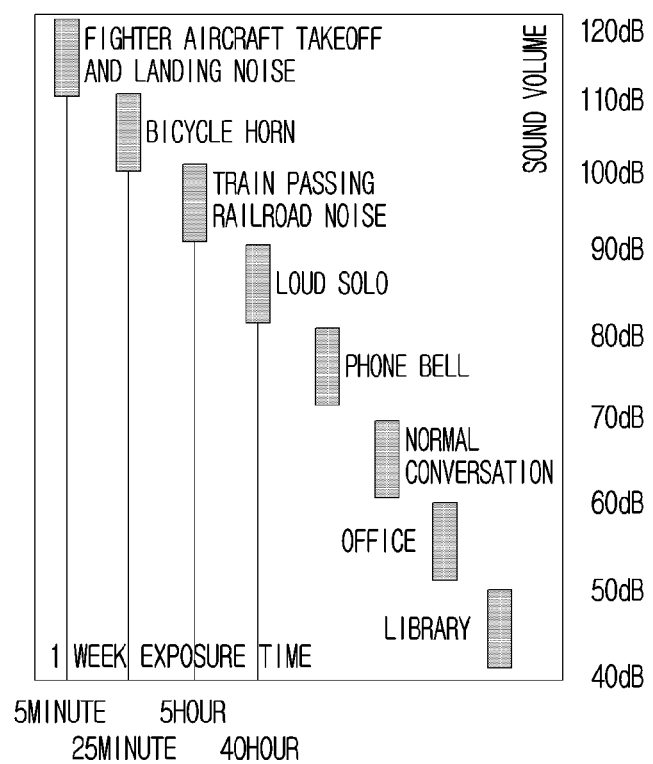
FIG. 21 is a diagram illustrating an example of a sound size and exposure time to which the present disclosure is applicable.

FIG. 21 is a diagram illustrating an example of a sound level and an exposure time to which the present disclosure is applicable.

Hearing is the result of a combination of actions in the ear that convert sound waves into signals that the brain can understand. Sound waves enter the ear and vibrate the eardrum and bones, and the vibrations are converted into electrical signals by the delicate hairs in the ear and transmitted to the brain along the nerves. The brain interprets these signals and perceives them as acoustic or sound. The noise level is measured in decibels (dB), and in general, sound above 80 dB is considered noise. Hearing is affected by the amount of noise and exposure time, and very loud noises can cause hearing loss even for short exposures. That is, repeated/continued exposure to loud noise may permanently damage the hairs in the ear. Examples of noise exposure limitation as disclosed in FIG. 21 show that as the loudness of a sound increases, even a short exposure time can affect hearing. Therefore, it is required to further reduce the exposure time as the sound is louder.

Figure 22:
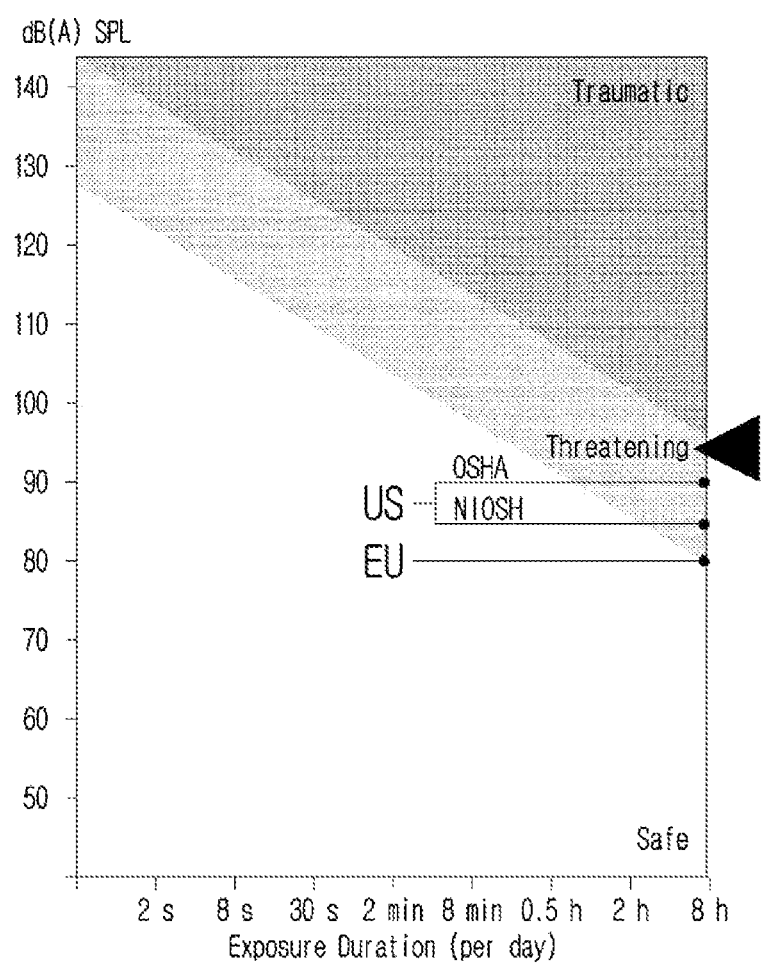
FIG. 22 is a diagram illustrating the relationship between a negative pressure level and an exposure time to which the present disclosure is applicable.

FIG. 22 is a diagram exemplarily illustrating a relationship between a sound pressure level and an exposure time to which the present disclosure is applicable.

In FIG. 22, the vertical axis represents the sound pressure level (SPL) in dB(A) or dBA, and the horizontal axis represents the exposure duration per day, and the safe, threatening, and traumatic according to the sound pressure level and exposure duration, are exemplarily shown. As mentioned above, the accumulated noise can damage the auditory nerve fibers. For example, prolonged listening to a portable music player at a loud volume increases the risk of hearing loss. Compressed music played through most portable music players is closer to noise than original music because of its high overall intensity. As time passes, auditory adapts comfortably to higher volumes, even if it is normal and comfortable, it can actually damage hearing. Therefore, the time of using earphones or headphones at high volume should be limited before hearing can adapt.

In this regard, international standards (EN50332-3 & ITU-T H.870) related to safe listening for personal/portable audio systems include information for informing and managing sound volume and related cumulative exposure to users, that is, dose.

The loudness of sound is generally expressed in units of pressure of pascals (Pa, 1 Pa=1 N/m2), and experimentally, the loudness of sound increases on a logarithmic scale of pascals. The sound pressure level (SPL) is used to objectify the subjective feeling of a person who determines the loudness and softness of a sound as an engineering index, and can be defined as Equation 1 below.

$$SPL = 20 \log_{10}(P/P_{ref}) \qquad \text{[Equation 1]}$$

Here, P represents the pressure of the sound. Pref is given as a predetermined constant $2*10^{\wedge}(-5)$ Pa, which corresponds to a minimum pressure size that a person can recognize. That is, the SPL of the sound of the Pref size is 0 dB.

In relation to the measurement of SPL, an A-weighting technique that reflects the level of sound that can be perceived by humans may be used, and the value measured by the A-weighting technique is expressed in dB(A) or dBA. A sound exposure or dose may be defined as in Equation 2 below.

$$E = \frac{1}{T} \int_0^T p(t)^2 dt \qquad \text{[Equation 2]}$$

Here, p means the sound pressure to which A-weighting is applied, and T means the specified length of time. As described above, since the sound exposure amount E is defined as a value obtained by integrating the sound pressure p(t) that changes for a predetermined time, it may have a value representing the sound pressure variable in the audio content.

A sound exposure level (SEL) is a logarithmic expression of an amount of sound exposure relative to the threshold E0 of human hearing, and may be defined as Equation 3 below.

$$SEL = 10 \log_{10}\left(\frac{E}{E_0}\right) \qquad \text{[Equation 3]}$$

For example, for an sound exposure level of 80 dBA, a normalized acoustic dose value of 40 hours per week may be applied as a warning criterion. For short duration sound exposure levels, it may be limited to 100 dBA for 30 seconds, i.e. dose values above 100 dBA for 30 seconds may be subject to a warning.

Figure 23:
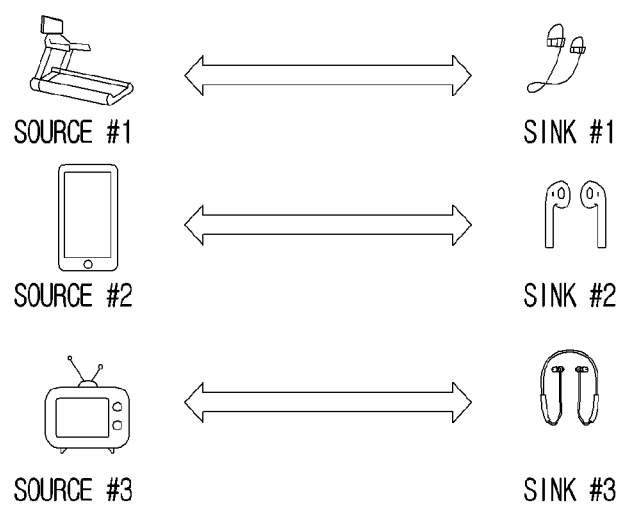
FIG. 23 is a diagram illustrating the relationship of a plurality of devices to which the present disclosure is applicable.

FIG. 23 is a diagram exemplarily illustrating a relationship between a plurality of devices to which the present disclosure is applicable.

Even when a single user uses a plurality of devices, it is required to calculate and manage the cumulative sound exposure for the corresponding user, but a method for supporting this has not been prepared yet.

In the example of FIG. 23, it may be assumed that the user connects the sports headset (sink #1) to the treadmill TV (source #1) at the gym to listen to audio, and then, while moving home, the user connect the earbuds (sink #2) to the music player application on their smartphone (source #2) to listen to audio, and when the user arrives at home, the user listens to the audio of the home TV (source #3) through the neckband headset (sink #3). As such, when a single user uses a plurality of source devices and/or a plurality of sink devices, a problem may occur in calculating the cumulative exposure amount. For example, it is necessary to determine which device will calculate the amount of sound exposure and the problem of how to determine this may arise. In addition, when the source and/or sink device used is changed, the problem of how to accumulate, calculate and manage exposures on each device may arise.

Therefore, the present disclosure proposes a new method for supporting informing the user of sound levels and the related cumulative exposures, and tracking and managing predetermined exposures (e.g., daily/weekly exposures) to notify users before they reach their maximum allowable exposure, or displaying the time remaining until the maximum allowable exposure, or reporting/exchanging exposure or volume level between devices to automatically configure the appropriate volume level for the user at the sink, etc.

In the present disclosure, the sound exposure management method, the sound exposure calculation method, and the communication method between devices supporting the same are collectively referred to as volume level reporting. Specifically, the volume level may correspond to an audio output or power level (e.g., a value in dBm or W) or a volume value expressed as a user-friendly value of the device. The power level may be changed by the user's operation or other factors. The sound pressure level (SPL) may be determined according to the power level of the device and the manufacturing characteristics/device environment of the device. Depending on the sound pressure level (SPL) and the exposure time (duration), the sound exposure amount (SEL) or the dose may vary. In the present disclosure, since the final sound exposure amount (or cumulative exposure amount) calculation and management is performed based on the volume level, the related procedures are collectively referred to as volume level reporting.

As discussed below, the factors involved in the determination of cumulative exposure may include at least one of the power level of the sink device, power level related characteristics (e.g., maximum power level, minimum power level, average power level, etc.), SPL, SPL-related characteristics (e.g. max SPL, min SPL, average SPL, etc.), exposure time (or duration), or SEL.

Also, a subject involved in determining the cumulative exposure amount may include entities such as a manager, an audio player, a source, and a sink. A detailed description of each individual will be described later.

Depending on the capabilities of the device/entity, the device/individual may directly calculate or determine factors related to the cumulative exposure amount, or may calculate or estimate it based on information provided from other devices/individuals. In addition, a GATT message may be used to transmit and receive one or more elements between entities. Such a GATT message may be defined in a solicited method of providing in response to a request or an unsolicited method of providing even if there is no request.

For example, the power level of the sink is calculated/determined by the sink and may be provided from the sink to one or more of an administrator, an audio player, or a source.

The SPL may be calculated/determined by one or more of an administrator, an audio player, a source, or a sink, and may be provided to one or more other entities from the entity that performed the calculation/determination.

The duration may be calculated/determined by one or more of a source, a sink, or an audio player, and may be provided to one or more other entities from an entity that has performed the calculation/determination.

The SEL may be calculated/determined by one or more of an administrator, an audio player, a source, or a sink, and may be provided to one or more other entities from the entity that performed the calculation/determination.

In addition, the operation of calculating and managing the cumulative exposure amount according to the present disclosure may be described as a server-client relationship. For example, a server (or GATT server) may correspond to a sink, and a client (or GATT client) may correspond to one or more of an administrator, an audio player, or a source. However, the present disclosure is not limited thereto, and an entity that provides information necessary for a corresponding operation may be referred to as a server, and an entity that reads information from or writes information to the server may be referred to as a client.

In the present disclosure, a new message and procedure required for volume level reporting may be defined as shown in Table 6 below. Messages and procedures defined in Table 6 may be supported by a specific profile or service.

TABLE 6

| Message/procedure | Description |
| --- | --- |
| Volume Level Configuration Start | This is a message transmitted and received between a Source/Sink and a Manager App before Audio transmission between the Source and the Sink starts. Volume Level Configuration Start message may be transmitted from a manager to a source and/or a sink, or may be transmitted from a source or a sink to a manager. The Manager App transmits and receives volume level configuration start message to and from the source and/or sink, and performs the necessary configuration for calculating the cumulative sound exposure. Through this, the Manager app configures the time when audio transmission between source and sink start, from which entity to which entity the value needed to calculate the audio power (or volume) level in the sink, how often to provide, the power level, SPL, exposure time, or what entity is responsible for calculating the cumulative exposure. |
| Volume Level Configuration Result | This is a message to inform the entity that sent the volume level configuration start message whether the entity that has received the volume level configuration start message sent by the manager app can operate according to the configurations included in the volume level configuration start message. The volume level configuration result message may be transmitted from the source and/or sink to the manager, and may be transmitted from the manager to the source and/or sink. |
| Status Changed Reporting | This message is sent by the object whose configurations have been changed when the configurations required for calculating the cumulative exposure amount are changed in an object while audio is being transmitted between the source and the sink. The Manager App is notified of changes to the object through status changed reporting. The object to send status changed reporting to the Manager App, information to be exchanged, etc. are configured in the volume level configuration start message exchange process, which may be configured differently depending on the object's capacity. (For example, whether the sink can calculate power level, exposure calculation, etc.) |
| Volume Level Configuration End | When the audio transmission between the source and the sink is completed, the manager app sends and receives a volume level configuration end message with the source/sink to determine the end of the audio transmission. The volume level configuration end message may be transmitted from the manager to the source and/or sink, or may be transmitted from the source or sink to the manager. The entity determined to be in charge of calculating the cumulative exposure according to the volume level configuration start/result message exchange calculates the cumulative exposure after the volume level configuration end message transmission/reception is completed. |

TABLE 6-continued

| Message/procedure | Description |
| --- | --- |
| Alert Reporting | When the calculated cumulative exposure exceeds a predetermined threshold, the manager app sends an alert reporting message to the audio player/source/sink. |
| Capability check procedure | This is a confirmation procedure for the functions supported by each entity (e.g., power level, SPL, exposure time, cumulative exposure calculation, etc.). Through capability check, the manager app understands the function of each entity, and decides from which entity to receive status changed reporting through the volume level configuration start/result message exchange procedure. |
| Volume Manager ID | The volume manager ID is an identifier for the unit that manages the calculated cumulative exposure. Since cumulative exposure calculation and management are performed in units of managers, manager ID means the unit that is the basis for summing up exposures. For example, user A's cumulative exposure is managed with volume manager ID #1, and user B's cumulative exposure is managed with volume manager ID #2. |

Figure 24:
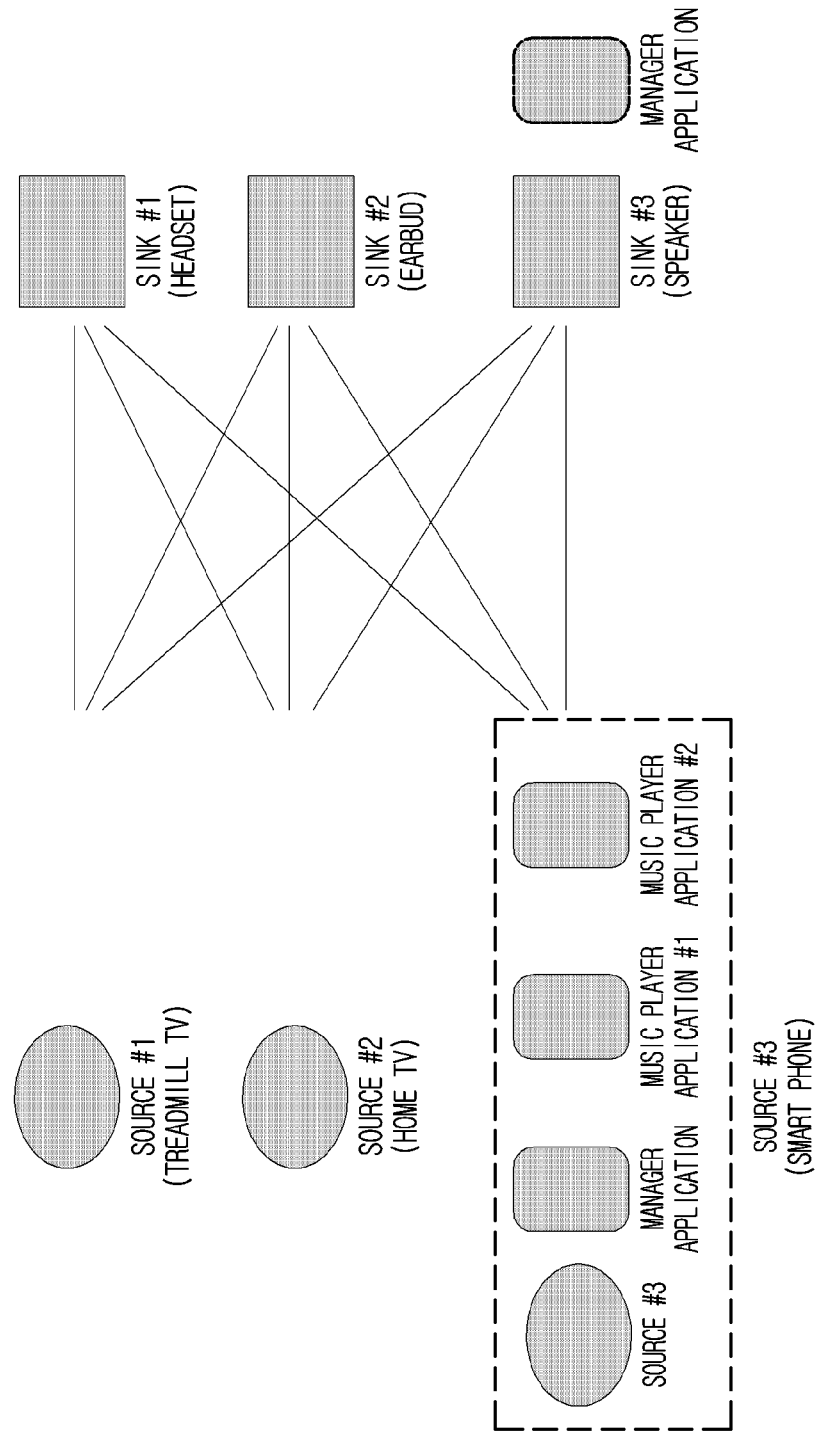
FIG. 24 is a diagram for describing a definition of an individual to which the present disclosure is applicable.

FIG. 24 is a diagram for describing a definition of an entity to which the present disclosure is applicable.

An entity involved in a procedure for managing the sound exposure time (or sound exposure amount) according to the sound pressure level and warning and guiding the user may be defined as follows.

A source may transmit synchronous audio. For example, the source may correspond to a smartphone, an audio beacon, a TV, and the like.

A sink may receive and render audio transmitted from a source. For example, the sink may correspond to a headset, earbuds, speakers, and the like. Also, the sink may calculate the power level or sound pressure level of the currently rendered audio.

The manager application manages overall procedures such as role distribution and final summation of calculation and management of cumulative exposure, for example, summing and managing sound exposure time or sound exposure.

The audio player application may perform functions related to audio transmission (e.g., select music, pause, play the next song, etc.). In the present disclosure, a music player application is assumed as a representative example, but the same may be applied to an application that reproduces various audio contents.

Here, the manager application, the audio player application, etc. may be configured as a software object, and may be included or implemented in any device. That is, the manager application, the audio player application, etc. may exist on the same device as the source object, but do not necessarily exist on the same device as the source object. For example, the manager application and/or the audio player application may reside on the same device as the sink object, or on a separate device that is neither a source nor a sink. That is, two or more of the entities described in the present disclosure may be included in the same device or may be included in different devices. Hereinafter, description will be made based on entities such as managers, audio players, sources, and sinks.

If the sink has the capability to calculate the audio transmission time (or exposure time), the manager may exchange SPL information with the sink.

If the sink does not have the capability to calculate the audio transmission time, the administrator may be configured to estimate the cumulative exposure by exchanging power level or volume information with the source in the configuration step (e.g., the procedure for exchanging the Volume Level Configuration Start or Volume Level Configuration Result message in Table 6).

Administrators may mainly exchange exposure time and SPL information with sources #1 through #3. This is because the source is more likely to be included in a device with higher computational power than the sink.

Administrators may show users the aggregated, managed sound level (power level or SPL) and associated cumulative exposure (dose) information. In addition, the administrator may transmit the corresponding information to one or more audio player applications to show the information to the user in each audio player application.

Figure 25:
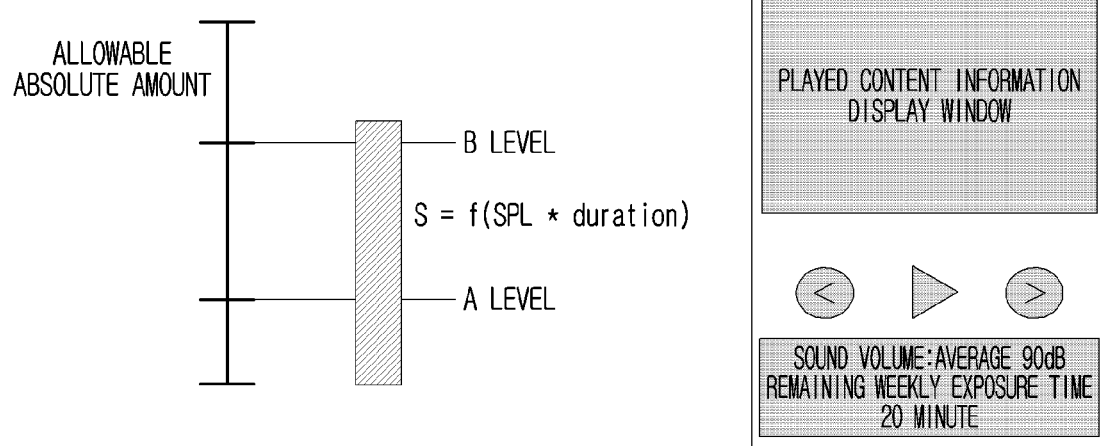
FIG. 25 is a diagram for describing an example of a dosage amount calculation to which the present disclosure is applicable.

FIG. 25 is a diagram for describing an example of an exposure amount calculation to which the present disclosure is applicable.

The exposure amount S may be determined based on the sound pressure level (SPL) and the exposure duration. For example, as in the example of FIG. 22, the exposure amount S may be defined as a product operation of SPL and duration. Alternatively, the exposure amount S may be defined as a predetermined function f based on SPL and duration, and may be expressed, for example, as S=f (SPL*duration). For example, the exposure amount S may correspond to the SEL described above.

In addition, the exposure amount S may be directly calculated or measured based on the SPL and the duration, and the S value may be estimated or estimated by further considering other factors in addition to the SPL and the duration.

For the calculation of the exposure amount S, the sink may support calculation or estimation of the sound pressure (or sound pressure level) value of the currently rendered audio.

For example, a sink may calculate an SPL based on its current power level and share it with a manager. If the sink does not have the ability to calculate the SPL, information on the correspondence between the power level (or volume) and the SPL may be shared with one or more of the manager, the source, and the sink. Accordingly, one or more of the manager, the source, or the sink may calculate or estimate the SPL of the sink.

For example, the SPL or power level may be calculated mainly by the sink and shared with other entities, and the duration may be calculated mainly by the source and shared with other entities. However, any one of the administrator, the source, and the sink may calculate or estimate the SPL, the duration and the exposure amount S alone, or two or more of them may share information with each other.

Since the correspondence between the volume and/or power level and the SPL may vary depending on the manufacturing characteristics of the sink, it may be configured in the form of a matching table for each manufacturer as shown in Table 7 below. For example, a matching table for a corresponding relationship between volume and/or power level and SPL may include: information on power level characteristics (e.g., minimum power level, maximum power level, average power level, etc.), information on SPL characteristics (e.g., minimum SPL, maximum SPL, average SPL, etc.).

TABLE 7

| Manufacturer | Volume | SPL |
|---|---|---|
| A | 5 | 80 |
|   | 4 | 50 |
|   | ... | ... |
| B | 4 | 60 |
|   | 3 | 50 |
|   | ... | ... |
| ... | ... | ... |

As described above, the exposure amount S may be compared with a predetermined threshold preset for the allowable absolute amount (or exposure amount), and a warning notification may be provided to the user. The threshold for the absolute allowable amount may be predefined as a predetermined exposure value.

For example, the administrator may perform a warning notification to the user by comparing the total cumulative exposure to date with the first warning threshold B level. For example, the value B may correspond to a boundary value (e.g., the SEL value corresponding to listening to audio with an SPL of 100 dBA and 8 minutes) between the safe area and the threat area as in the example of FIG. 22. Also, as in the example of FIG. 25, when the total cumulative exposure S exceeds the B level, a corresponding warning (e.g., "the cumulative exposure exceeds 800") may be notified to the user.

As a further example, the administrator may perform an alert notification to the user by comparing the total cumulative exposure to the second alert threshold A level. For example, the value A may be configured to a value that corresponds to a safe area in the example of FIG. 22 but requires a warning in advance. For example, the warning notification may be configured in the form of notifying the time required until reaching the threat area (or level B) (i.e., allowable time) in the case of continuously listening to audio while maintaining the current SPL. Here, allowable time=allowable absolute amount (or exposure amount)/current volume (or power level or current SPL) may be defined. In the example of FIG. 25, when the total cumulative exposure amount S exceeds the A level, a corresponding warning (e.g., "Listening at the current volume for more than 5 minutes may damage your hearing. Turn the volume down.") may be notified to the user.

In the present disclosure, the entity performing the alert notification may be an administrator, but a source, sink, or audio player may directly calculate the cumulative exposure amount or receive a cumulative exposure amount from another entity, and may perform a warning notification based thereon. For example, as shown in FIG. 25, in the music player application, the average sound level (or power level or current SPL) of the audio content being played and the calculated remaining allowable exposure time may be displayed to the user.

Figure 26:
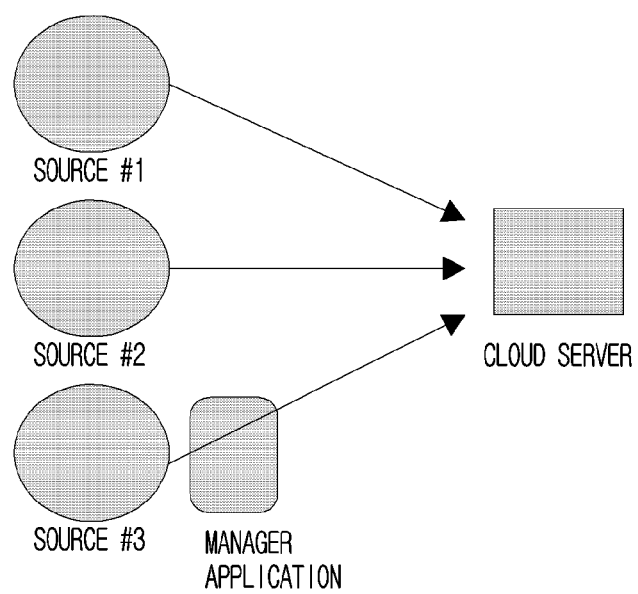
FIG. 26 is a diagram for describing a cumulative exposure method using a cloud server to which the present disclosure is applicable.

FIG. 26 is a diagram for describing a method for managing a cumulative exposure amount using a cloud server to which the present disclosure is applicable.

According to this example, SPL, exposure time, cumulative exposure, etc. may be received from a plurality of sources using a cloud server, and recorded and managed.

The cloud server may maintain and manage information on registration/removal of source(s) associated with a specific user account.

For example, an example for the case of source temporary registration is as follows.

In the case of a publicly used source (e.g., source #1), a user may connect a nearby public source to the cloud server for a certain period of time. For example, the source and the cloud server may be directly connected, or the source and the cloud server may be connected through an administrator application on the user's side (e.g., installed on the user's smartphone (e.g., source #3)). The connection between the source and the cloud server may mean a state in which the source is registered in the cloud server and information may be transmitted/received between the source and the cloud server. For example, the source may be configured to be connected to the cloud server for a predetermined time (e.g., a time when a user uses a public source). The source that maintains the connection with the cloud server for a predetermined time may calculate the cumulative exposure amount up to the present at the time when the predetermined time expires (e.g., when the user stops using the public source) and transmit it to the cloud server. The predetermined time may be extended according to the user's selection, and if the user does not make a special selection, the connection between the source and the cloud server may be terminated after the predetermined time expires.

As a further example, the source may be permanently (or without time limit) registered with the cloud server. This may be the case for sources that are privately owned by the user rather than a public source. In this case, the user may authenticate the source to the cloud server and continuously transmit the cumulative exposure from the source to the cloud server.

When the source calculates the cumulative exposure amount, a sharing cycle, a sharing event, a specific user (e.g., User ID or Admin ID), etc. may be configured in order to share/deliver the result value to an administrator or a cloud server.

Figure 27:
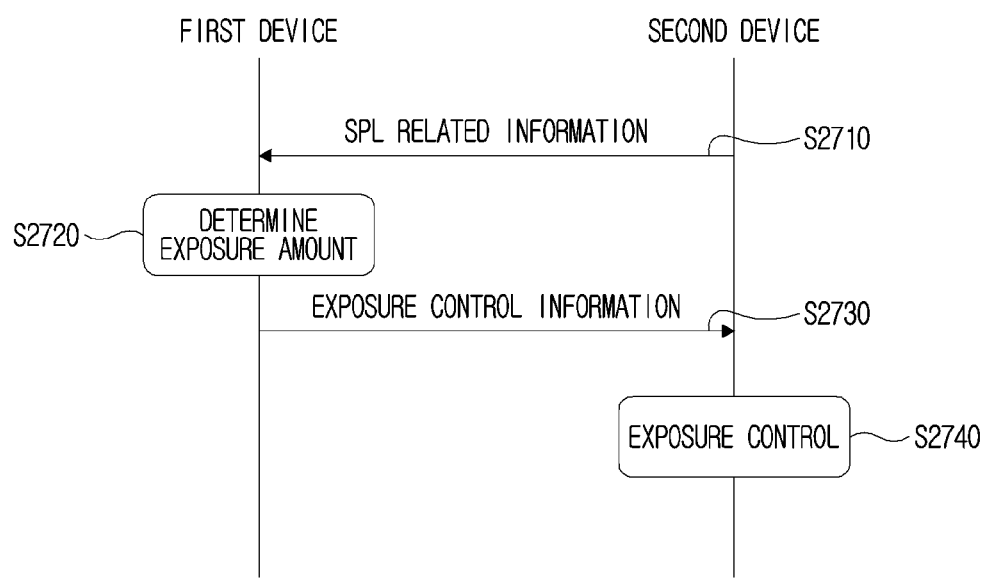
FIG. 27 is a diagram for describing an example of a volume level reporting method to which the present disclosure is applicable.

FIG. 27 is a diagram for describing an example of a volume level reporting method to which the present disclosure is applicable.

In operation S2710, the second device may report SPL-related information (i.e., first information) to the first device. For example, the SPL-related information may include information (or sound sensitivity parameter) about a coefficient for converting the volume level (or power level)(e.g., dB, dBm, or W units) of the second device into an actual sound level (e.g., dBA unit). For example, the parameter for calculating the SPL using the volume-SPL matching information (or table) as shown in Table 7 or the power/volume level may be reported from the second device to the first device. The first information may include, for example, a minimum power level or minimum SPL, a maximum power level or maximum SPL, an average power level or an average SPL, and the like.

In step S2720, the first device may determine the exposure amount. The exposure amount may be calculated based on a volume level, a power level, an SPL, a duration, and the like. One or more of the information necessary for calculating the exposure amount may be provided from the second device.

In step S2730, the first device may transmit exposure adjustment information (i.e., second information) to the second device. For example, the exposure amount adjustment information may include information for configuring/indicating/recommending to adjust a volume level or a power level to a specific value. Alternatively, the exposure amount adjustment information may include information indicating that time and/or volume level (or power level) needs to be adjusted when the cumulative exposure amount to date exceeds a predetermined threshold.

In step S2740, the second device may adjust the exposure amount based on the exposure amount adjustment information. Adjusting the exposure amount may include adjusting a volume level or a power level to a specific value. For example, based on a specific volume level configured/indicated/recommended by the first device, the second device may control its output volume based on its own volume-SPL matching characteristic. Alternatively, the exposure amount adjustment may include modifying the exposure time and/or the volume level (or power level) based on the exposure amount adjustment information provided from the first device.

In the example of FIG. 27, the first device may be a client, and the second device may be a server. Alternatively, the first device may be a source and the second device may be a sink. When the first device is a source, the source may include a manager/music player application and the like.

In the example of FIG. 27, it is assumed that one second device is described, but one or more second devices may perform volume level reporting with the first device. The volume level reporting procedure of FIG. 27 may be separately performed for each of one or more second devices, or the volume level reporting procedure of FIG. 27 may be commonly performed with respect to one or more second devices (i.e., for example, such that a plurality of second devices share the volume level).

Various sinks may have different sound characteristics according to their structures, and sound outputs of different sizes may be generated for each sink even with the same volume level value. In order to solve this problem, as described in the example of FIG. 27, a source or a client may determine a volume setting using an actual sound output characteristic (e.g., volume-SPL matching information) of a sink or a server. In addition, the sink or the server may interpret the volume setting provided from the source or the client based on its actual sound output characteristic (e.g., volume-SPL matching information) to output a sound having an appropriate size. Accordingly, consistent volume control is possible, and an actual acoustic exposure amount that actually affects a user's hearing can be accurately calculated and managed.

Figure 28:
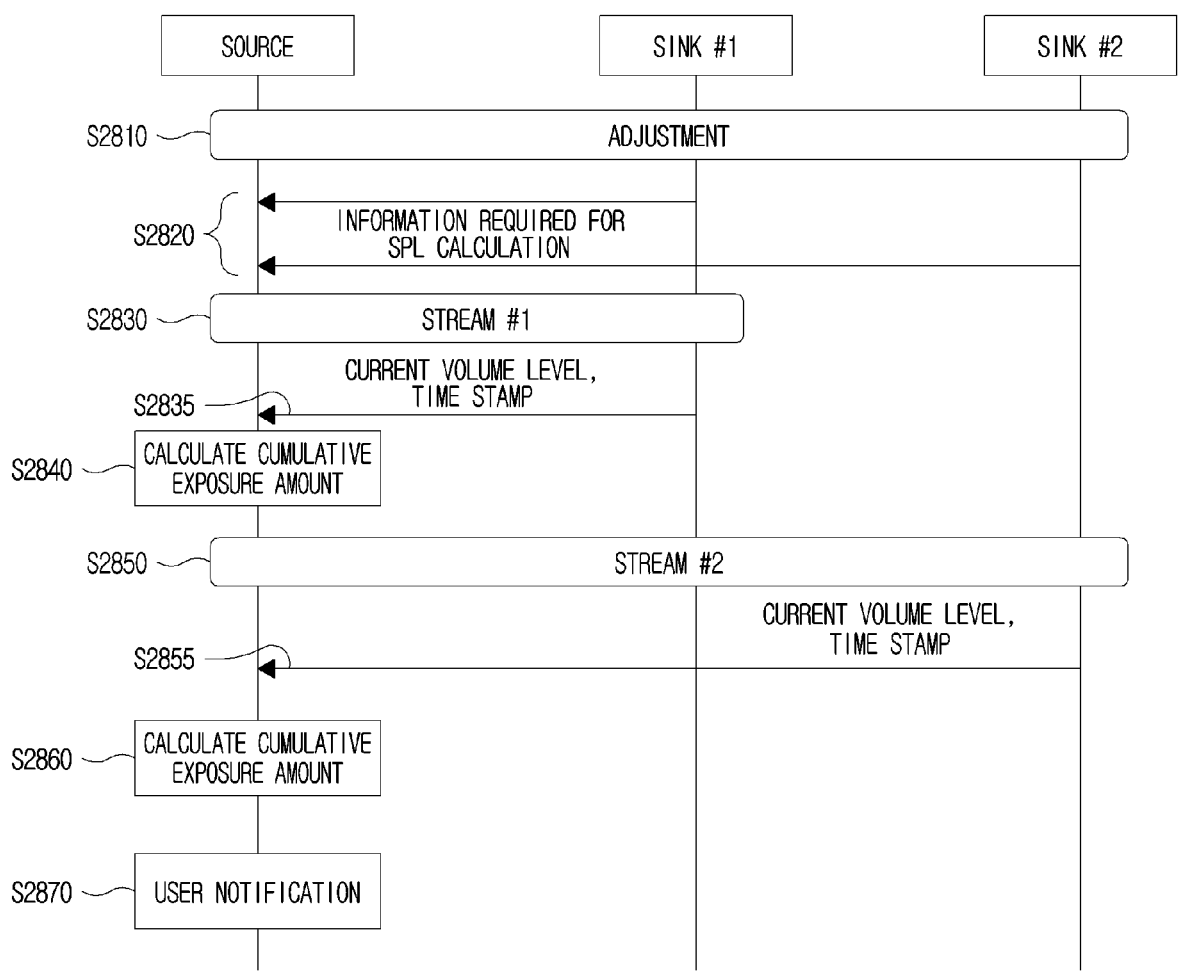
FIG. 28 is a diagram for describing an additional example of a volume level reporting method to which the present disclosure is applicable.

FIG. 28 is a diagram for describing an additional example of a volume level reporting method to which the present disclosure is applicable.

The example of FIG. 28 shows a situation in which a volume level (or power level) is shared among a plurality of entities. It is assumed that the source and the manager are included in the same device, or the source and the audio player are included in the same device. In the volume level reporting operation, a case where the manager/audio player on the source side performs control. For example, the sink may be a headset, earbuds, or speaker, and the source may be a smartphone.

In the calibration phase, the source/manager/audio player and sinks #1 and #2 may check their respective capabilities, and based on this, the volume level configuration start and volume level configuration result message exchange may be configured for how to deliver an entity to perform calculation/estimation of power level, SPL, duration, and SEL, and information to be shared between entities (S2810).

For example, the source/administrator/audio player may receive, from sinks #1 and #2, a coefficient for converting the volume level (or power level) (e.g. in dB, dBm, or W) of each sink into an actual sound level (e.g., dBA unit) (S2820). As a specific example, it is assumed that each sink can determine its own power level, but the sink cannot perform SPL calculation based on the power/volume level. In this case, each sink may provide the source/manager/audio player with information necessary to calculate/estimate the SPL based on its own power/volume level and the power/volume level. For example, each sink may provide the source/manager/audio player with a coefficient or sound sensitivity parameter necessary for calculating the actual volume for each volume. For example, a parameter capable of calculating the SPL using a volume-SPL matching table as shown in Table 7 or a power/volume level may be provided. Accordingly, the source/manager/audio player may calculate/estimate the SPL of the corresponding sink using the power level (or volume level) and the coefficient/parameter received from each sink.

After the configuring necessary for calculating the cumulative exposure amount is completed in this way, audio stream #1 may be started (S2830). After stream #1 starts, the source/manager/audio player may calculate the actual volume (e.g., dBA unit) to which the user is exposed, based on the current volume level (or power level) (e.g., in dB, dBm, or W) received from the sink #1 (S2840).

Also, after stream #2 is started (S2850), the source/manager/audio player may calculate the actual volume (e.g., in dBA units) to which the user is exposed based on the current volume level (or power level) (e.g. in dB, dBm, or W) received from the sink #2 (S2860).

Information such as a current volume level (or power level) and a timestamp may be transmitted from the sink to the source/manager/audio player at a predetermined period or event-triggered during audio streaming (S2835, S2845). Accordingly, the source/administrator/audio player may start calculating cumulative exposure (e.g., SEL). If the sink's volume level (or power level) is modified during audio streaming, by transmitting this to the source/administrator/audio player together with the timestamp information, the amount of exposure up to the current time may be calculated by calculating and accumulating the variable SPL.

The source/manager/audio player may calculate and monitor the total cumulative exposure for stream #1 at sink #1 and stream #2 at sink #2. If the total cumulative exposure so far exceeds a predetermined threshold, it may be to advise the user to stop listening (e.g., above the B level threshold in the example of FIG. 25), indicate the time remaining until the point in time when listening is advised (e.g., exceeding the A level threshold in the example of FIG. 25), or inform how long to rest after stopping listening (e.g., the point in time at which exposures are expected to be reset, taking into account cumulative exposures over the past 24 hours at the present time) (S2870). In this way, the source/administrator/audio player may provide the user with the exposure time (e.g., the amount of time that has elapsed since the audio stream started), the degree of exposure (e.g., current volume level, current power level, or current SPL, etc.), and the remaining time (e.g., the remaining time of the audio stream, or the warning notification time related to the A level in the example of FIG. 25, etc.), etc. through a predetermined UI (e.g., visual and/or auditory information).

Figure 29:
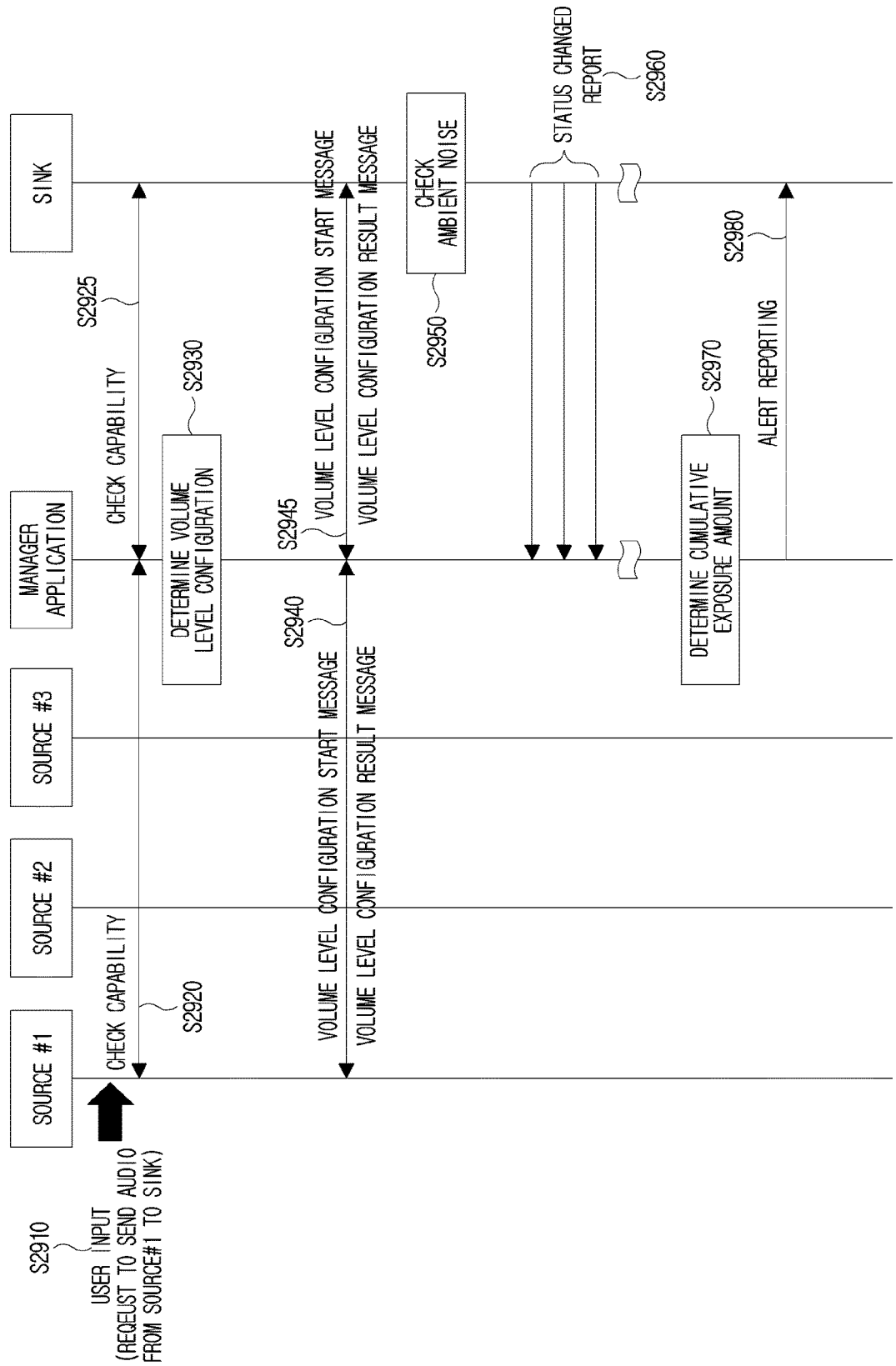
FIG. 29 is a diagram for describing an additional example of a volume level reporting method to which the present disclosure is applicable.

FIG. 29 is a diagram for describing an additional example of a volume level reporting method to which the present disclosure is applicable.

In the example of FIG. 29, the capability check procedure may include a process in which an administrator inquires a function supported by each entity (e.g., source, sink), and each entity responds to this. In the example of FIG. 29, it is assumed that the user requests/instructs audio transmission from the source #1 to the sink (S2910), so the manager may perform a capability check procedure for the source #1 and the sink (S2920, S2925).

For example, the capability may include primary properties and optional properties (primary properties).

The primary properties may include the following information (or characteristics).
  a. Whether the sink can determine/calculate the exposure level (or SPL)
  b. Whether the source can determine/calculate the exposure level (or SPL)
  c. Whether the sink can receive Alert Reporting and user voice notifications
  d. Whether the source can report and receive notifications and user voice notifications Among the optional properties, the following information (or characteristics) may be included with respect to the method of identifying/calculating the exposure level of the sink.
  e. Whether the sink can determine/calculate an exposure level (or SPL) based on volume/power level
  f. Whether the sink can measure ambient noise through the microphone
  g. Whether the sink can notify you of exceeding cumulative exposure via voice prompts In the example of FIG. 29 , cases of a possible, b impossible, c possible, d impossible, e possible, f. possible, and g. possible are assumed.

Through this capability check process, the administrator may determine the volume level setting (S2930). For example, among the volume/power level, SPL, duration, and SEL, which entity calculates/determines which information, which entity transmits which information to which entity, etc. may be determined.

Accordingly, the manager may transmit a volume level configuration start message to the source #1 and/or sink, and receive a volume level configuration result message from each of the source #1 and/or sink (S2940, S2945). That is, through volume level configuration result message transmission and reception, how to calculate the cumulative exposure and what value to exchange may be confirmed and shared.

The sink may basically calculate/determine a power level corresponding to the volume level, but may additionally calculate/determine a modified power level in consideration of the surrounding environment (S2950). For example, the sink may calculate/determine a corrected power level by checking and determining ambient noise through a microphone, and may calculate its own exposure level (e.g., SPL) based on the corrected power level. Accordingly, the sink may notify the administrator of the calculation completion value periodically (e.g., every 5 minutes) or when a predetermined event occurs (e.g., when the volume level is changed by the user at the sink, or when audio streaming ends) through Status Changed Reporting (S2960).

Also, the manager may determine whether the cumulative exposure amount exceeds a predetermined threshold (S2970). When the cumulative exposure amount exceeds a predetermined threshold, the administrator may notify the user through a UI (e.g., visual and/or auditory information). Additionally, the manager may also deliver the corresponding information to the sink through Alert Reporting (S2980). Accordingly, a corresponding notification may be provided to the user according to the threshold step (e.g., exceeding the A level, exceeding the B level in the example of FIG. 25, etc.) through the sink.

As described above, the volume/power level may not be proportional to the SPL depending on device-specific manufacturing characteristics or device environment. Accordingly, device-to-device coordination may be performed by checking device capabilities related to the characteristics of each device. For example, the device capability may further include information (e.g., a matching table, a volume curve, etc.) on a correspondence relationship between a volume and/or a power level and an SPL. In addition, the device capability may include surrounding environment information as described above. The surrounding environment information may further include a distance between devices (e.g., distance between source and sink), a signal characteristic related to a distance between devices (e.g., received signal strength information (RSSI), pathloss, etc.), and the like. Adjustment and/or volume level configuration may be performed based on such device capabilities.

Figure 30:
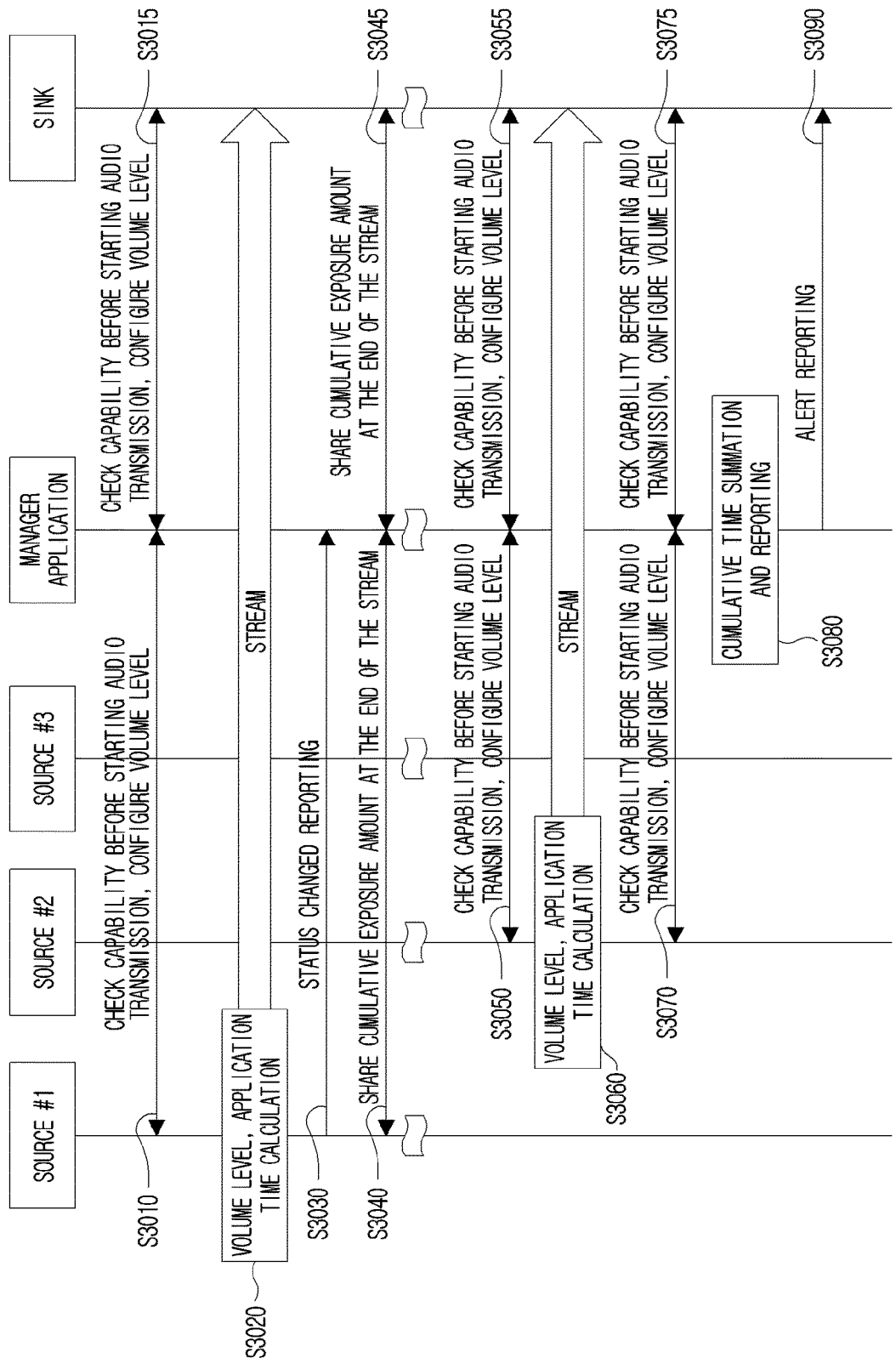
FIG. 30 is a diagram for describing an example of a source change procedure to which the present disclosure is applicable.

FIG. 30 is a diagram for describing an example of a source change procedure to which the present disclosure is applicable.

Before starting audio transmission from the source #1 to the sink, the manager and the source #1 and/or the sink may perform a capability check and volume level configuration (e.g., volume level configuration start and volume level configuration result message exchange) (S3010 and S3015). Accordingly, it may be determined which entity calculates/determines which information among power level, SPL, duration, and SEL, which entity transmits which information to which entity, and the like. In the example of FIG. 30, it is assumed that the source #1 has the capability of calculating the SPL, and a process in which the sink transmits the volume/power level to the source #1 and/or the manager may be performed, but is omitted from the drawing.

As the audio streaming from the source #1 to the synchro starts, the source #1 may calculate the volume level and application time, that is, SPL and duration (or start/end time point) (S3020). The calculated information may be transmitted from source #1 to the manager. In addition, SPL and duration information may be delivered to the manager through a status changed report message periodically or event-based (e.g., change of a volume level of a sink or end of audio streaming) during audio streaming (S3030).

When the audio streaming is finished, the source #1, the manager, and/or the sink may share the cumulative exposure amount (e.g., SEL) information up to now (S3040, S3045). Cumulative exposure may be calculated/determined by the administrator and shared with other entities, but may also be calculated at a source or sink and reported to the administrator and other entities.

After the audio streaming from the source #1 to the sink is finished, audio streaming from the source #2 to the sink may be requested.

Before starting the audio transmission from the source #2 to the sink, the manager and the source #2 and/or the sink may perform a capability check and volume level configuration (e.g., volume level configuration start and volume level configuration result message exchange) (S3050 and S3055). Accordingly, among power level, SPL, duration, and SEL, which entity calculates/determines which information, and which entity transmits which information to which entity, etc. may be determined. In the example of FIG. 30, it is assumed that the source #2 has the capability of calculating the SPL, and a process in which the sink transmits the volume/power level to the source #2 and/or the manager may be performed, but is omitted from the drawing.

As audio streaming from source #2 to the synchro starts, source #2 may calculate a volume level and application time, that is, SPL and duration (or start/end time) (S3060). The calculated information may be transmitted from source #2 to the administrator. In addition, SPL and duration information may be delivered to the manager through a status change report message periodically during audio streaming or based on an event (e.g., change of a volume level of a sink or termination of audio streaming).

When the audio streaming is finished, the source #2, the manager, and/or the sink may share the cumulative exposure amount (e.g., SEL) information up to now (S3070, S3075). Cumulative exposure may be calculated/determined by the administrator and shared with other entities, but may also be calculated at a source or sink and reported to the administrator and other entities.

Here, before, during, or after the volume level configuration procedure for the source #2 and/or the sink is performed, the cumulative exposure amount (i.e., the amount of cumulative exposure during audio streaming from source #1 to sink) to date may be shared by the source #2, the manager, and/or the sink.

Accordingly, the manager may sum up the cumulative exposures through the audio streaming from the source #1 and the audio streaming from the source #2, and determine and monitor the total cumulative exposure until now (S3080). When the total cumulative exposure exceeds a predetermined threshold, notifications such as a recommendation to stop listening, a notification of the remaining time until the middle of listening, and a recommendation for a break time after stopping listening may be performed. In addition, such notification information may be delivered to the sink through an alert reporting message (S3090), and the sink may notify the user of the corresponding information through an appropriate UI.

A method of discovering, connecting, and exchanging messages between a plurality of sources, managers, and/or sinks is not limited, and various technologies such as a cloud server and Bluetooth mesh may be used.

Figure 31:
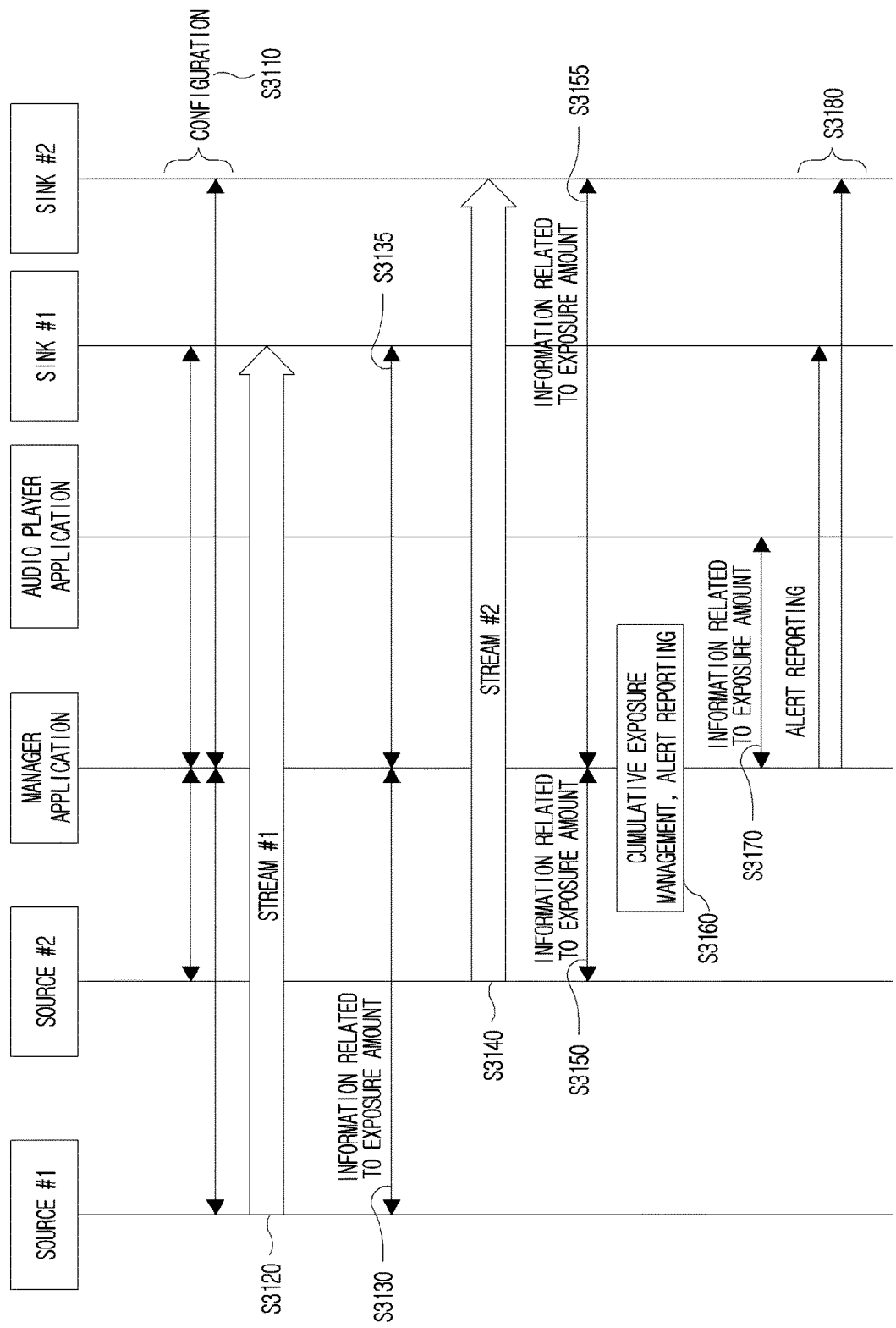
FIG. 31 is a diagram for describing an additional example of a source change procedure to which the present disclosure is applicable.

FIG. 31 is a diagram for describing an additional example of a source change procedure to which the present disclosure is applicable.

The administrator may check the respective capabilities of source #1 and #2, audio player, sink #1 and #2, calculate/determine which information among power level, SPL, duration, and SEL through the exchange of volume level configuration start and volume level configuration result messages. And, it may be determined which entity transmits which information to which entity, and the like.

The configuration procedure S3110 of FIG. 31 may include various examples. For example, for streaming audio from source #1 to sink #1, the administrator may configure the source #1 to calculate only time (e.g., duration or start/end point) information and report it to the manager, and the sink #1 to report only its own power level to the manager.

As a further example, in the case of audio streaming from source #2 to sink #2, the administrator may configure source #2 to calculate and report the power level, SPL, duration, and SEL to the administrator. In addition, various methods of configuration may be performed.

When audio streaming #1 from the source #1 to the sink #1 starts (S3120), the source #1, the manager, and the sink #1 may periodically or event-based transmit/receive (S3130, S3135) exposure-related information according to the configuration (S3110). Cumulative exposure may be shared between source #1, manager, and sink #1 during audio streaming or after audio streaming has ended.

When audio streaming #2 from source #2 to sink #2 is started (S3140), source #2, manager, and sink #2 may periodically or event-based transmit/receive (S3150, S3155) exposure-related information according to configuration (S3110). Cumulative exposure may be shared between source #2, manager, and sink #2 during audio streaming or after audio streaming has ended.

Administrators may continuously calculate and manage cumulative exposure from the start of stream #1 and stream #2 to the end. When it is detected that the cumulative exposure exceeds a predetermined threshold, the administrator may perform a corresponding alert reporting (e.g., the administrator notifies the user directly or through another entity) (S3160).

For example, the manager may share the cumulative exposure information with the audio player (S3170). Accordingly, the exposure information may be informed to the user through the audio player controlling the audio streaming.

In addition, when the cumulative exposure exceeds a predetermined threshold, the manager may deliver a notification report message to sink #1 or sink #2, so that notifications such as a listening stop recommendation, a time remaining until the middle of listening, and a break time recommendation after stopping listening may be performed (S3180).

In various examples of the present disclosure described above, information related to calculating the cumulative exposure amount (e.g., power level, SPL, duration, SEL, etc.) may be managed in association with a user ID or an administrator ID. This is to manage the cumulative exposure for each actual user even when the user listens to audio across a plurality of sources and a plurality of sinks.

In addition, in the various examples of the present disclosure described above, the predetermined threshold (e.g., A level, B level, etc. in FIG. 25) for the cumulative exposure amount may be given as a preconfigured value or may be configured to an arbitrary value through a configuration procedure.

Figure 32:
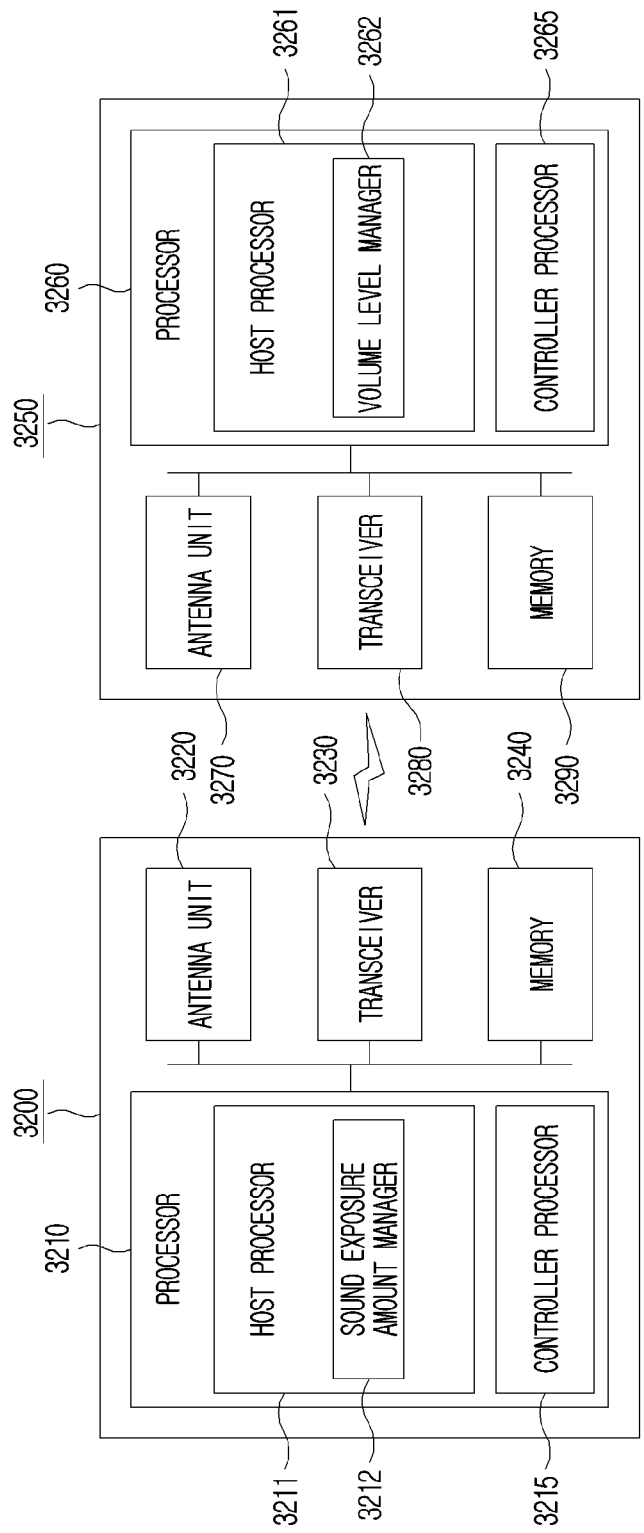
FIG. 32 is a diagram illustrating a configuration of a first device and a second device to which the present disclosure is applicable.

FIG. 32 is a diagram illustrating configuration of the first device and the second device.

The first device 3200 may include a processor 3210, an antenna unit 3220, a transceiver 3230, and a memory 3240.

The processor 3210 may perform baseband-related signal processing and may include a host processor 3211 and a controller processor 3215. The host processor 3211 and the controller processor 3215 may exchange information through HCI. The host processor 3211 may process operations such as L2CAP, ATT, GATT, GAP, and LE profile layers. The controller processor 3215 may process operations such as LL and PHY layers. The processor 3210 may control the overall operation of the first device 3200 in addition to performing baseband-related signal processing.

Antenna unit 3220 may include one or more physical antennas. The transceiver 3230 may include RF (Radio Frequency) transmitter and RF receiver. The memory 3240 may store information processed by the processor 3210 and software, an operating system, and an application related to the operation of the first device 3200, and may include components such as a buffer and the like.

The processor 3210 of the first device 3200 may be configured to implement an operation of the first device (or, an audio source, or a client device) in the embodiments described in the present disclosure.

For example, the host processor 3211 of the processor 3210 of the first device 3200 may include a sound exposure amount manager 3212.

The sound exposure amount manager 3212 may determine a volume setting for the second device 3250 by using the first information (e.g., information related to the SPL of the first device) reported from the second device 3250. Additionally, the sound exposure amount manager 3212 may calculate the cumulative sound exposure based on the first information (e.g., SPL-related information, volume level, power level, duration, etc.).

The sound exposure amount manager 3212 may transmit second information including the volume setting for the second device 3250 to the second device 3250 through the controller processor 3215. Additionally, the second information may include exposure amount control information.

The second device 3250 may include a processor 3260, an antenna unit 3270, transceiver 3280, and a memory 3290.

The processor 3260 may perform baseband-related signal processing and may include a host processor 3261 and a controller processor 3265. The host processor 3261 and the controller processor 3265 may exchange information through HCI. The host processor 3261 may process operations such as L2CAP, ATT, GATT, GAP, and LE profile layers. The controller processor 3265 may process operations of the LL layer, the PHY layer, and the like. The processor 3260 may control the overall operation of the second device 3260 in addition to performing baseband-related signal processing.

The antenna unit 3270 may include one or more physical antennas. The transceiver 3280 may include an RF transmitter and an RF receiver. The memory 3290 may store information processed by the processor 3260 and software, an operating system, and an application related to the operation of the second device 3250, and may include components such as a buffer and the like.

The processor 3260 of the second terminal device 3250 may be configured to implement the operation of the second device (or client) in the embodiments described in the present disclosure.

For example, the host processor 3261 of the processor 3260 of the second device 3250 may include a volume level manager 3262.

The volume level manager 3262 may transmit the first information related to the SPL of the second device 3250 to the first device 3200 through the controller processor 3265. Additionally, the first information may include SPL-related information, a volume level, a power level, a duration, and the like.

The volume level manager 3262 may adjust the volume of the second device 3250 based on the second information including the volume setting received from the first device 3200 and the first information. Additionally, the second information may include exposure amount control information.

In the operation of the first device 3200 and the second device 3250, the descriptions of the server and the client in the examples of the present invention may a be applied in the same manner, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:
1. A method performed by a first device in a wireless communication system, the method comprising:
  calibrating a volume level;
  receiving, from the at least one second device, first information related to a sound pressure level (SPL) of the at least one second device; and
  transmitting, to the at least one second device, second information including a volume setting to adjust a volume of the at least one second device based on the first information and the second information,
  wherein the calibrating comprises checking respective capabilities of the first device and the least one second device, and performing a volume level configuration based on the capabilities, before receiving the first information or transmitting the second information.

2. The method of claim 1, wherein:

the first information includes at least one of information on a coefficient for converting a volume level of the second device into an actual sound level, a sound sensitivity parameter, or volume-SPL matching information.

3. The method of claim 2, wherein:

the volume setting included in the second information is determined by the first device using the first information.

4. The method of claim 1, wherein:

the second information is exposure adjustment information, and the exposure is determined based on one or more of a volume level, a power level, SPL, and an exposure duration of the at least one second device.

5. The method of claim 4, wherein:

the exposure adjustment information is generated when a cumulative exposure amount for the first device, or a cumulative exposure amount for the first device and at least one third device exceeds a predetermined threshold.

6. The method of claim 1, wherein the volume level configuration includes:

configuration for an entity to perform calculation of a volume level, power level, SPL, duration, sound exposure level (SEL), or configuration for information to be exchanged between the first device and the at least one second device and an exchange method.

7. The method of claim 1, wherein:

cumulative exposure amount at the at least one second device is determined by the first device during an audio stream from the first device to the at least one second device or after the audio stream ends.

8. The method of claim 7, wherein:

when a volume level of the at least one second device is changed during the audio stream, the changed volume level and timestamp information are provided to the first device, and the cumulative exposure amount is determined further based on the changed volume level and the timestamp information.

9. The method of claim 1, wherein:

the first device is an audio source or a client, and each of the at least one second device is an audio sink or a server.

10. A device in a wireless communication system, the device comprising:

a transceiver for performing signal transmission and reception with another device; and a processor for controlling the transceiver and the device, wherein the processor is configured to:

calibrate a volume level;

receive, from the at least one another device, through the transceiver, first information related to a sound pressure level (SPL) of the at least one another device; and transmit, to the at least one another device, through the transceiver, second information including a volume setting to adjust a volume of the at least one device based on the first information and the second information, wherein the calibrating comprises checking respective capabilities or properties of the first device and the least one second device, and performing a volume level configuration based on the capabilities or properties, before receiving the first information or transmitting the second information.

* * * * *